(12) United States Patent
Li et al.

(10) Patent No.: US 12,413,464 B2
(45) Date of Patent: Sep. 9, 2025

(54) CONFIGURABLE CORRELATOR BANK FOR A NON-COHERENT DSSS DEMODULATOR

(71) Applicant: Silicon Laboratories Inc., Austin, TX (US)

(72) Inventors: Wentao Li, Austin, TX (US); Yan Zhou, Spicewood, TX (US); Terry Lee Dickey, Pflugerville, TX (US)

(73) Assignee: Silicon Laboratories Inc., Austin, TX (US)

( * ) Notice: Subject to any disclaimer, the term of this patent is extended or adjusted under 35 U.S.C. 154(b) by 111 days.

(21) Appl. No.: 18/217,019

(22) Filed: Jun. 30, 2023

(65) Prior Publication Data

US 2025/0007770 A1 Jan. 2, 2025

(51) Int. Cl.
*H04L 27/26* (2006.01)
*H04L 5/00* (2006.01)
*H04L 25/497* (2006.01)

(52) U.S. Cl.
CPC ........ *H04L 27/2663* (2013.01); *H04L 5/0048* (2013.01); *H04L 25/497* (2013.01)

(58) Field of Classification Search
CPC .. H04L 27/2663; H04L 5/0048; H04L 25/497
See application file for complete search history.

(56) References Cited

U.S. PATENT DOCUMENTS

| | | |
|---|---|---|
| 4,583,048 A | 4/1986 | Gumacos |
| 7,106,784 B2 | 9/2006 | Eltawil |
| 7,173,919 B1 | 2/2007 | Dabak |
| 8,018,378 B2 | 9/2011 | Sun |
| 9,031,001 B2 | 5/2015 | Yang |
| 2008/0019314 A1 | 1/2008 | Gorokhov |

(Continued)

OTHER PUBLICATIONS

Zhang, G. et al., "Implementation-Friendly and Energy-Efficient symbol-by-Symbol Detection Scheme for IEEE 802.15.4 O-QPSK Receivers," in IEEE Access, vol. 8, pp. 158402-158415, Aug. 28, 2020, doi: 10.1109/ACCESS.2020.3020183, (Year: 2020).

(Continued)

*Primary Examiner* — Vineeta S Panwalkar
(74) *Attorney, Agent, or Firm* — Zagorin Cave LLP

(57) ABSTRACT

A demodulator has a correlator bank with multiple correlators. The correlator bank has multiple configurations, including a signal arrival configuration, a coarse timing configuration, and a despreading configuration. The various configurations are used to correlate function transformations of received symbols to template signals. Each correlator has elements with a number of delay blocks corresponding to a number of chips in a symbol. The output of each delay block is multiplied by a bit of a template signal by negating or not negating the output and the multiplications results are summed. A function transformations block receives phase information to generate the function transformations, which are supplied to the correlators. The function transformations include a transformation with a one chip differential, transformations with multi-chip differentials, an average transformation that includes an average of a one-chip phase difference between two adjacent samples, and a second order phase differentiation used for frequency deviation correlation.

20 Claims, 36 Drawing Sheets

(56) References Cited

U.S. PATENT DOCUMENTS

| | | |
|---|---|---|
| 2008/0152018 A1 | 6/2008 | Ma |
| 2009/0175631 A1* | 7/2009 | Ikushima ............... H04L 27/06 398/210 |
| 2016/0065337 A1 | 3/2016 | Atungsiri |
| 2017/0099077 A1 | 4/2017 | Tamma |
| 2022/0200654 A1 | 6/2022 | Baier |
| 2025/0007769 A1 | 1/2025 | Li et al. |

OTHER PUBLICATIONS

Divsalar, D., and Simon, M., "Multiple-Symbol Differential Detection of MPSK," IEEE Transactions on Communications, vol. 38, No. 3, Mar. 1990, 9 pages.

Simon, M., "Multiple-Bit Differential Detection of Offset QPSK," IEEE Transactions on Communications, vol. 51, No. 6, Jun. 2003, 8 pages.

Wilson, S., et al., "Multi-Symbol Detection of M-DPSK," IEEE Global Telecommunications Conference and Exhibition Communications Technology for 1990s and Beyond,' Nov. 27-30, 1989, 6 pages.

* cited by examiner

| Data Symbol | Chip Values ($c_0c_1c_2...c_{30}c_{31}$) |
|---|---|
| 0 | 11011001110000110101001000101110 |
| 1 | 11101101100111000011010100100010 |
| 2 | 00101110110110011100001101010010 |
| 3 | 00100010111011011001110000110101 |
| 4 | 01010010001011101101100111000011 |
| 5 | 00110101001000101110110110011100 |
| 6 | 11000011010100100010111011011001 |
| 7 | 10011100001101010010001011101101 |
| 8 | 10001100100101100000011101111011 |
| 9 | 10111000110010010110000001110111 |
| 10 | 01111011000110010010110000000111 |
| 11 | 01110111101110001100100101100000 |
| 12 | 00000111011110111000110010010110 |
| 13 | 01100000011101111011100011001001 |
| 14 | 10010110000001110111101110001100 |
| 15 | 11001001011000000111011110111000 |

Fig. 1

| Octets: 4 | 1 | 1 | | variable |
|---|---|---|---|---|
| Preamble | SFD | Frame Length (7bits) | Reserved (1 bit) | PSDU |
| Synchronization Header (SHR) | | PHY Header (PHR) | | PHY payload |

Fig. 2

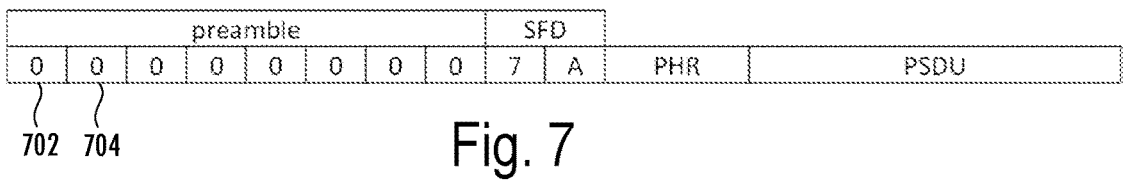
Fig. 7
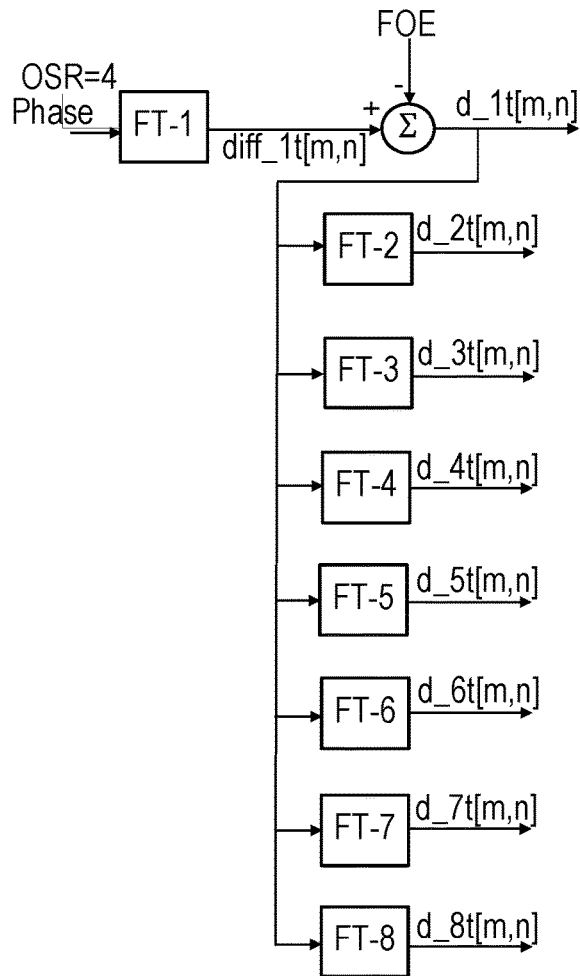
Fig. 8
| n | m | diff_1t[m,n] |
|---|---|---|
| 0 | 0 | diff_1t[0,0] = phase[0] - phase[-4] |
| 0 | 1 | diff_1t[1,0] = phase[1] - phase[-3] |
| 0 | 2 | diff_1t[2,0] = phase[2] - phase[-2] |
| 0 | 3 | diff_1t[3,0] = phase[3] - phase[-1] |
| 1 | 0 | diff_1t[0,1] = phase[4] - phase[0] |
| 1 | 1 | diff_1t[1,1] = phase[5] - phase[1] |
| 1 | 2 | diff_1t[2,1] = phase[6] - phase[2] |
| 1 | 3 | diff_1t[3,1] = phase[7] - phase[3] |
| 2 | 0 | diff_1t[0,2] = phase[8] - phase[4] |
| 2 | 1 | diff_1t[1,2] = phase[9] - phase[5] |
| 2 | 2 | diff_1t[2,2] = phase[10] - phase[6] |
| 2 | 3 | diff_1t[3,2] = phase[11] - phase[7] |
Fig. 9
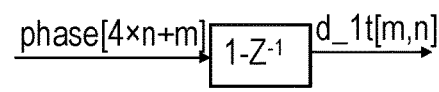
Fig. 11
| phase_diff[5:0] | | Frequency Value |
|---|---|---|
| Angle | Number | |
| $+\pi$ | 31 | 1000 kHz |
| $+\pi/2$ | 16 | 500 kHz |
| 0 | 0 | 0 kHz |
| $-\pi/2$ | -16 | -500 kHz |
| $-\pi$ | -32 | -1000 kHz |
Fig. 10

Weighted Function-1: Cosine-Weighted Function

Weighted Function-2: Sine-Weighted Function

Calculate oqpsk2msk[i]
oqpsk2msk[36] = !(pre_c[4] ^ pre_c[5]);
oqpsk2msk[35] =   pre_c[3] ^ pre_c[4];
oqpsk2msk[34] = !(pre_c[2] ^ pre_c[3]);   ← 2402
oqpsk2msk[33] =   pre_c[1] ^ pre_c[2];
oqpsk2msk[32] = !(pre_c[0] ^ pre_c[1]);
oqpsk2msk[31] =   c[31] ^ pre_c[0];

2404 →
```
for (i = 0; i< 31; i= i+2) begin
  oqpsk2msk[i] = !(c[i] ^ c[i+1]);
end
```
← Even number

```
for (i= 1; i < 30; i = i+2) begin
  oqpsk2msk[i] = c[i] ^ c[i+1];
end
```
← Odd number Calculate oqpsk2msk_q1[i]
   for (i= 0; i < 36; i = i+1) begin
     oqpsk2msk_q1[i] = oqpsk2msk[i];
   end
Calculate oqpsk2msk_q2[i]
   for (i= 0; i < 35; i = i+1) begin
     oqpsk2msk_q2[i]= oqpsk2msk_q1[i+1];
   end                                                        2406
Calculate oqpsk2msk_q3[i]
   for (i= 0; i < 34; i = i+1) begin
     oqpsk2msk_q4[i]= oqpsk2msk_q2[i+1];
   end
Calculate oqpsk2msk_q4[i]
   for (i= 0; i < 33; i = i+1) begin
     oqpsk2msk_q4[i]= oqpsk2msk_q3[i+1];
   end
Calculate oqpsk2msk_q5[i]
   for (i= 0; i < 32; i = i+1) begin
     oqpsk2msk_q5[i]= oqpsk2msk_q4[i+1];
   end

Fig. 24A

```
for (k = 0; k < 32; k = k+1) begin
    c_1t[k] = oqpsk2msk[k];
    c_2t[k] =   c_1t[k] ^ (!oqpsk2msk_q1[k]);
    c_3t[k] = !(c_1t[k] ^ oqpsk2msk_q1[k] ^ oqpsk2msk_q2[k]);
    c_4t[k] = !(c_3t[k] ^ oqpsk2msk_q3[k]);
    c_5t[k] =  (c_4t[k] ^ oqpsk2msk_q4[k]);
    c_6t[k] = !(c_5t[k] ^ oqpsk2msk_q5[k]);
    c_7t[k] =   c_1t[k];
    c_8t[k] =   c_1t[k];
end
```

Fig. 24B

```
c_lt[31:0]=      1 1 1 0 0 0 0 0 0 1 1 1 0 1 1 1 1 0 1 0 1 1 1 0 0 1 1 0 1 1 0 0
c_lt_shift[31:0]= 0 1 1 1 0 0 0 0 0 0 1 1 1 0 1 1 1 1 0 1 0 1 1 1 0 0 1 1 0 1 1 0
c_lt_xor[31:0]=   1 0 0 1 0 0 0 0 0 1 0 0 1 1 0 0 0 1 1 1 1 0 0 1 0 1 0 1 1 0 1 0
``` c_lt[k] right shift to create c_lt_sfift(k)
    c_lt_shift(31) = c_lt(0);
    for (k=0; k < 31; k = k+1)    c_lt_shift(k) = c_lt(k+1);
Bitwise XOR operator to create c_lt_xor (k)
    for (k=0; k < 31; k = k+1) c_lt_xor (k) = c_lt_shift(k) XOR c_lt[k];
      The bitwise operator XOR performs "exclusive or" logical operation. If input bits are the same, then the output will be false(0) else true(1)

If c_lt_xor [k] is logic 1, the template code corresponds to the transitions of frequency deviation
If c_lt_xor [k] is logic 0,
  If d_8t[k] < ripple_threshold and d_8t[k] >= -ripple_threshold, set inside_range [k] = 1
  else set inside_range [k] = 0

Correlation:
$$corr[n] = \sum_{k=0}^{32-1} xc[k]$$

| c_lt_xor[k] | c_lt[k] | inside_range[k] | Correlation-Matrix |
|---|---|---|---|
| 1 | 1 | Don't care | xc[k] = dly[k] |
| 1 | 0 | Don't care | xc[k] = -dly[k] |
| 0 | Don't care | 1 | xc[k] = 16 |
| 0 | Don't care | 0 | xc[k] = -16 |

3102

Assuming

3104

| phase_diff[5:0] | | Frequency Value |
|---|---|---|
| Angle | Number | |
| +π | 31 | 1000 kHz |
| +π/2 | 16 | 500 kHz |
| 0 | 0 | 0 kHz |
| -π/2 | -16 | -500 kHz |
| -π | -32 | -1000 kHz |

Fig. 31

CONFIGURABLE CORRELATOR BANK FOR A NON-COHERENT DSSS DEMODULATOR

CROSS-REFERENCE TO RELATED APPLICATION(S)

This application relates to the application entitled "NON-COHERENT DSSS DEMODULATOR WITH FAST SIGNAL ARRIVAL DETECTION AND IMPROVED TIMING AND FREQUENCY OFFSET ESTIMATION", filed Jun. 30, 2023, naming Wentao Li, et. al., as inventors, and having application Ser. No. 18/217,015, which application is incorporated herein by reference.

BACKGROUND

Field of the Invention

This disclosure relates to demodulators and particularly to demodulators having fast Direct Sequence Spread Spectrum (DSSS) signal arrival detection and more accurate initial timing and frequency offset estimation and more robust DSSS despreading.

Description of the Related Art

Internet of Things (IoT) wireless communication device-based products often need to operate on multiple wireless protocols such as IEEE 802.15.4 based protocols (Zigbee™ and Open Thread) and Bluetooth® Low Energy/Bluetooth (BLE/BT Mesh). Prior solutions to a communication system using multiple physical layers (PHYs) have been to integrate two or more wireless communication devices or use Dynamic Multi-Protocol (DMP), which is software that switches between multiple protocols using time multiplexing. Use of multiple wireless communication devices increases product size and cost due to multiple or larger integrated circuits, more antennas, increased external bill of materials (BOM), etc., and DMP cannot adequately support more than one protocol that requires near 100% receive (RX) listening. Current DMP solutions can only handle the BLE Connection interval case with the rest of the time spent on 802.15.4 unknown RX arrival listening. With only one demodulator being used, in order to switch to another wireless protocol, firmware stops current demodulator operations and then computes new settings and restarts the demodulator in the new protocol. Relative to the duration of preambles in BLE (8 µs) and IEEE 802.15.4 (128 µs) a context switch, i.e., switching to receiving transmissions transmitted with a different wireless protocol, can take a long time and result in dropped communications. In addition, with only one wireless protocol being received, other wireless protocols are blocked until the receiver becomes free. The receiver does not have prior knowledge regarding which one of the multiple PHYs is being transmitted. If the DSSS demodulator used for the 802.15.4 PHY does not have fast signal arrival detection abilities, the DSSS demodulator will block other traffic while performing signal arrival detection.

There are several types of DSSS demodulators. A coherent DSSS demodulator requires phase synchronization of a received signal to the transmit signal for optimum performance. Due to the difficult task of synchronizing and tracking the incoming signal phase, a coherent DSSS demodulator requires more preamble symbols for frequency and timing synchronization. That makes fast signal arrival detection more difficult. A non-coherent DSSS demodulator eliminates the requirement of complex synchronization circuit architectures and algorithms. In addition, the non-coherent demodulator uses the phase information from the Cordic and does not require digital automatic gain control (AGC). Thus, non-coherent DSSS demodulators have faster timing synchronization, are more robust, and easier to implement than the coherent DSSS demodulator. That makes a non-coherent DSSS demodulator an attractive alternative to a coherent demodulator in a fast signal arrival detection application.

Signal arrival detection in the conventional non-coherent DSSS demodulator also requires a long preamble sequence since the DSSS demodulator is required to work in a very low signal-to-noise ratio (SNR) environment. It is very difficult to quickly scan channels, especially in a multi-PHY environment, if the receiver for one of the PHYs has slow signal arrival detection.

It would be desirable to be able to provide better capability to listen for transmissions sent with different wireless protocols to reduce the chances for dropped communications, reduce latency, and increase communication speeds. Accordingly, it would be desirable to provide a demodulator having a configurable correlator bank that can help achieve fast DSSS signal arrival detection and improved timing and frequency offset estimation and accurate despreading.

SUMMARY OF EMBODIMENTS OF THE INVENTION

In one embodiment a demodulator includes a correlator bank having a plurality of correlators. The correlator bank can be configured into a plurality of configurations including a signal arrival configuration, a coarse timing configuration, and a despreading configuration, to correlate function transformations of one or more received signals. The correlator bank is coupled to receive function transformations of one or more received signals and template signals corresponding to expected signals.

In another embodiment a method for demodulating one or more received signals includes configuring a correlator bank into multiple configurations to correlate function transformations of one or more received symbols. The plurality of configurations including a signal arrival configuration, a coarse timing configuration, and a despreading configuration. The method further includes receiving phase information in a function transformations block and generating the function transformations in the function transformations block. The function transformations include a one chip differential, additional transformations that include respective multi-chip differentials, an average transformation that includes an average of a one-chip phase difference between two adjacent samples of a signal, and a second order phase differentiation used for frequency deviation correlation. The function transformations are supplied to the correlator bank.

In another embodiment a demodulator includes a correlator bank having a plurality of correlators. The correlator bank can be configured into a plurality of configurations, including a signal arrival configuration, a coarse timing configuration, and a despreading configuration, to correlate function transformations of one or more respective received symbols to template signals. Each of the correlators includes a plurality of elements and each of the plurality of elements includes a plurality of delay blocks corresponding to a number of chips in a symbol, a multiply function coupled to multiply an output of each of the delay blocks by one bit of a template signal and a summation block to sum the output of multiply function and supply an element output. A function transformations block is coupled to receive phase information from a Cordic and to generate the function transformations and supply the function transformations to the correlator bank. The function transformations block generates a first transformation that includes a one chip differential, additional transformations that include respective multi-chip differentials, an average transformation that includes an average of a one-chip phase difference between two adjacent samples, and a second order phase differentiation used for frequency deviation correlation.

BRIEF DESCRIPTION OF THE DRAWINGS

The present invention may be better understood, and its numerous objects, features, and advantages made apparent to those skilled in the art by referencing the accompanying drawings.

FIG. 1 is a table showing the symbol-to-chip mapping for the 2450 MHz and 2380 MHz bands O-QPSK PHY (from IEEE Standard 802.15.4-2015-IEEE Standard for Low-Rate Wireless Networks).

FIG. 2 illustrates a packet structure for transmission as specified for the IEEE Std 802.15.4 O-QPSK PHY.

FIG. 7 illustrates the IEEE Std 802.15.4 O-QPSK packet and particularly the preamble and the Start of Frame Delimiter (SFD) portions of the packet used for signal detection and timing.

FIG. 8 illustrates a block diagram of the function transformations (FT-1 through FT-8).

FIG. 9 illustrates calculating a one chip phase difference (diff_1t[m,n]) for three samples.

FIG. 10 shows how to map the value of phase difference to frequency.

FIG. 11 illustrates that FT-1 is a one chip phase difference.

FIG. 24A illustrates the calculation of oqpsk2msk for generation of template signals.

FIG. 24B illustrates the determination of the template signals for the MSK demodulator.

FIG. 31 illustrates how the template code is interpreted in the correlation matrix used in the special mode of element [7].

The use of the same reference symbols in different drawings indicates similar or identical items.

DETAILED DESCRIPTION

Before describing details of embodiments of the demodulator and use thereof, some background on the signals being demodulated is provided. IEEE 802.15.4 O-QPSK utilizes half-sine-shaped Offset Quadrature Phase Shift Keying (OQPSK), which is equivalent to minimum-shift keying (MSK) modulation. The use of direct sequence spread spectrum (DSSS) increases the signal band width (BW) to gain a lower bit error rate (BER) for the same received signal-to-noise (SNR) ratio. DSSS helps overcome interference by spreading 4-bits into 32-chip pseudo-random noise (PN) sequences. IEEE Std 802.15.4 O-QPSK uses 16 symbols, each of 32 chips. Each symbol represents 4 bits. Each symbol is mapped into a nearly orthogonal 32-chip sequence as specified in the table shown in FIG. 1. The baud rate is 250 kbps, the chip rate is 2 Mchips per second, and the symbol rate is 62.5 k symbols per second.

IEEE Std 802.15.4 O-QPSK transmits data in a packet shown in FIG. 2. The packet includes a preamble field composed of 8 symbol zeros, a Start of Frame Delimiter (SFD) field, also referred to as a sync-word, that is composed of predefined bits indicating the end of the preamble and the start of the packet data. The 8-symbol preamble and 2-symbol sync-word can be used for initial timing/frequency acquisition.

For DSSS, the chip sequences representing each data symbol are modulated onto the carrier using OQPSK with half-sine pulse shaping. Even-indexed chips are modulated onto the in-phase (I) carrier, and odd-indexed chips are modulated onto the quadrature-phase (Q) carrier. In the 2450 MHz and 2380 MHz bands, since each data symbol is represented by a 32-chip sequence, the chip rate is 32 times the symbol rate.

Figure 3:
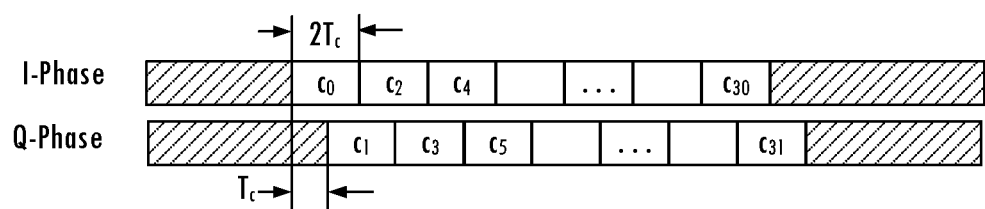
FIG. 3 illustrates the offset between I-phase and Q-phase chip modulation.

Referring to FIG. 3, to form the offset between I-phase and Q-phase chip modulation, the Q-phase chips are delayed by the time Tc with respect to the I-phase chips, where Tc is the inverse of the chip rate.

In the 2450 MHZ, 915 MHz, 868 MHz, and 2380 MHz bands, the half-sine pulse shape is used to represent each baseband chip and is as follows:

$$p(t) = \begin{cases} \sin\left(\pi \frac{t}{2T_c}\right), & 0 \le t \le 2T_c \\ 0, & \text{otherwise} \end{cases}$$

Figure 4:
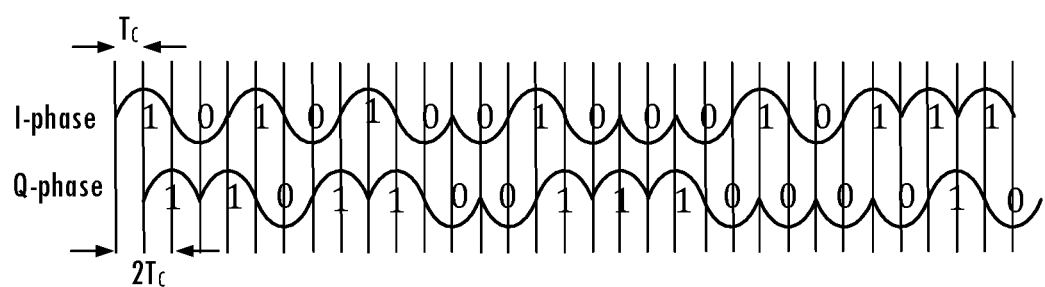
FIG. 4 illustrates a sample baseband chip sequence (the zero sequence) with half-sine pulse shaping.

FIG. 4 illustrates a sample baseband chip sequence (the zero sequence) with half-sine pulse shaping. The baseband OQPSK signal is:

$$s(t) = \sum_n I_n g(t - 2nT_c) + j \sum_n Q_n g(t - 2nT_c - T_c)$$

The baseband signals are converted to RF: $S_{RF}(t) = \text{Re}\{s(t)e^{j2\pi f_{ctx}t}\}$, where $f_{ctx}$ is the carrier frequency at the transmitter. The chip duration is Tc=0.5 µs, from which the symbol rate can be inferred (1/Tc)/32=62.5 kilo-symbols/s and the data rate of the OQPSK PHY is 62.5×4=250 kb/s.

The chip sequences are modulated onto the carrier using OQPSK with half-sine pulse shaping, which is equivalent to MSK modulation with a modulation index h=0.5. But to make the MSK strictly equivalent to the specified OQPSK format, data is coded and the MSK/OQPSK chip coder is as follows. The binary chip in the table in FIG. 1 is translated into signed data through the relations:

| c[k] | c_oqpsk[k] |
|---|---|
| 1 | +1 |
| 0 | −1 |

The signed MSK chip data c_msk_signed[k] can be calculated by:

$$c\_msk\_signed[2*n] = c\_oqpsk[2*n+1] * c\_oqpsk[2*n]$$

$$c\_msk\_signed[2*n+1] = -c\_oqpsk[2*n+2] * c\_oqpsk[2*n+1]$$

where n=0, 1, 2, 3, 4, . . .
k=2*n if k is an even number; k=2*n+1 if k is an odd number.
The binary MSK chip c_msk[k] can be translated by

| c_msk_signed[k] | c_msk[k] |
|---|---|
| +1 | 1 |
| −1 | 0 |

Figure 5:
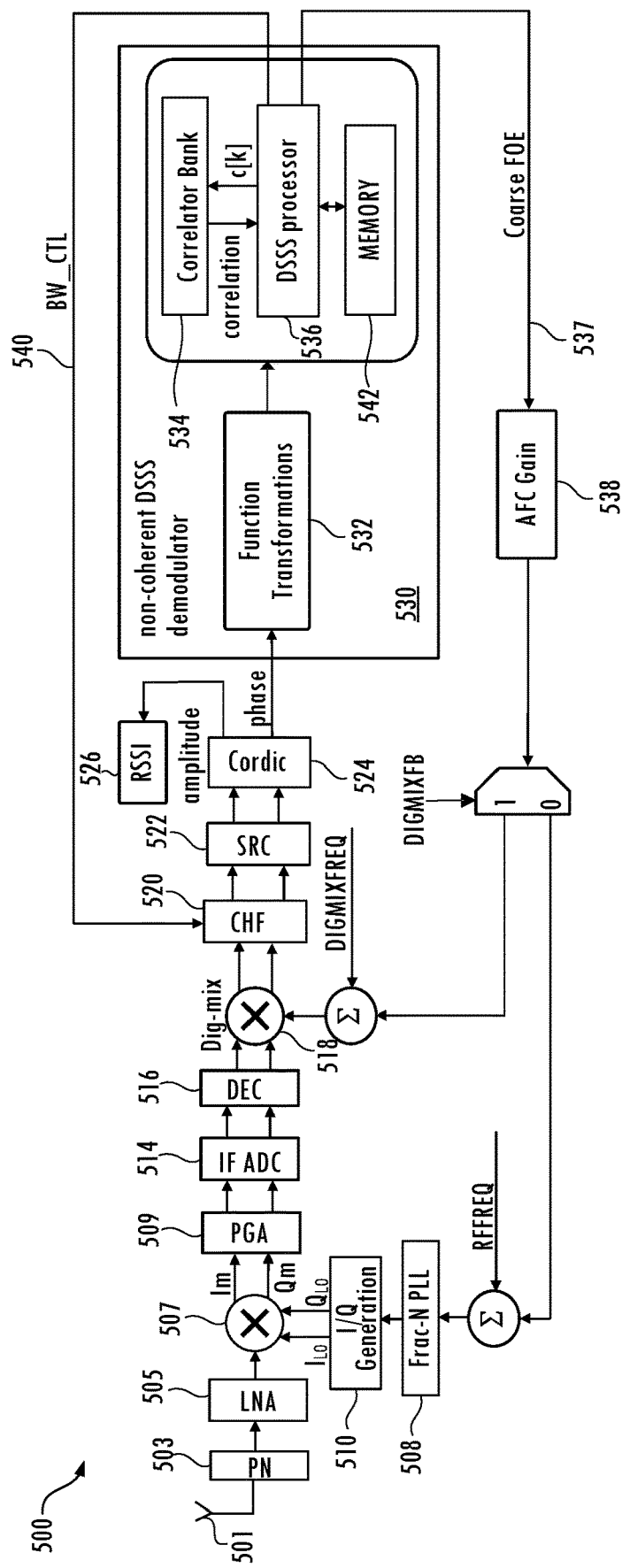
FIG. 5 illustrates a high-level block diagram of an embodiment of a receiver of a wireless communications device with a non-coherent DSSS demodulator.

FIG. 5 illustrates a high-level block diagram of an embodiment of a receiver 500 included in a wireless communications device. The receiver has the capability for fast signal arrival detection. The receiver 500 uses a heterodyne (intermediate frequency (IF) sampling) receive architecture. A series of passive and active devices down-converts the carrier radio frequency (RF) to either a low or high intermediate frequency (IF) for sampling while maintaining signal integrity. Antenna 501 provides an RF signal to passive network (PN) 503 that provides impedance matching, filtering, and electrostatic discharge protection. Low-noise amplifier (LNA) 505 amplifies the signals from passive network 503 without substantial degradation to the signal-to-noise ratio and provides the amplified RF signals to mixer 507. Mixer 507 performs frequency translation or shifting of the RF signals, using local oscillator (LO) signals generated using a fractional-N phase-locked loop (PLL) 508 and I/Q generation block 510 that converts the local oscillator signal from frac-N PLL 508 to $I_{LO}$ and $Q_{LO}$ signals for the mixer.

Mixer 507 provides the translated output signal as a set of two signals, an in-phase (Im) signal, and a quadrature (Qm) signal, to programmable gain amplifiers (PGA) 509. The Im and Qm signals are analog time-domain signals. In at least one embodiment of receiver 500, the PGA amplifiers 509 and filters (not separately illustrated) provide amplified and filtered version of the Im and Qm signals to an analog-to-digital converter (ADC) 514, which converts those versions of the Im and Qm signals to digital signals. ADC 514 provides digital I and Q signals to decimator 516, which supplies signals to the digital mixer 518. The digital mixer removes IF and the Channel Filter (CHF) 520 provides filtering to make the radio resilient against out of channel interferers. CHF bandwidth is configurable to combine a wide frequency offset tracking range with optimized sensitivity as explained further herein. An embodiment selects the IF frequency to be 1.369977 MHz. In an embodiment, the initial CHF bandwidth (BW) is 2.2 MHz and after signal arrival detection is triggered, CHF BW is switched to 1.8 MHz. Of course, other bandwidths may be selected for the CHF in other embodiments. The sampling rate converter (SRC) 522 scales the channel filter output sample rate with respect to the expected chip rate to an integer value. That eliminates the sample phase jitter. That does not, however, guarantee the chip sample phase is correct. A timing loop described further herein is required to provide chip timing information. The Cordic 524 converts the I and Q signals to phase and amplitude. Amplitude information is provided to the received signal strength indicator (RSSI) block 526. The Cordic also supplies phase information to the demodulator block 530.

The demodulator block 530 includes the "function transformations" block 532 that transforms the phase into one chip and multi-chip (from 2 to 6 chips) differential detections, averages a one-chip phase difference between two adjacent samples (interpretation), and provides a second order differentiation. The function transformations are described further herein. The demodulator block 530 also includes correlator bank 534 that computes correlation of the transformations received from the function transformations block 532 with the corresponding template signals c(k) for the duration of the whole symbol sequence. The correlator bank also performs as an "average filter" to estimate the frequency offset. The DSSS processor 536 generates the template signals c[k] based on the pre-defined DSSS symbol-to-chip table. The DSSS processor determines which symbol the received signal is most likely to be (maximum likelihood) based on the output of the correlator bank. This soft decision detection of the DSSS code achieves a more than 2 dB improvement over other approaches. The DSSS processor determines if the first preamble symbol is detected in a one-symbol observation period. After the first symbol is detected, the coarse frequency offset error (FOE) 537 is fed back to the digital mixer 518 or the frac-N PLL 508 through the automatic frequency control (AFC) block 538. In addition, the bandwidth of the channel filter 520 is narrowed using bandwidth control signal 540 to improve sensitivity following the detection of the first preamble symbol for use in detecting the second preamble symbol. The demodulator 530 is also used for timing/frequency acquisition and tracking.

In embodiments DSSS processor 536 performs a variety of functions (e.g., logic, arithmetic, etc.) needed for demodulation and other signal processing tasks. The DSSS processor may also use the demodulated data in a program, routine, or algorithm (whether in software, firmware, hardware, or a combination) to perform desired control or data processing tasks. In an embodiment, the DSSS processor includes one or more processors such as a microcontroller(s) and software and/or firmware to perform the desired demodulation functions described herein. The memory 542 stores software and firmware for use by processor 536 to perform various tasks and stores data supplied to or generated by processor 536. The memory 542 may include multiple kinds of memory in various embodiments including dynamic random-access memory (DRAM), static random access memory (SRAM), and/or non-volatile memory (NVM), according to system needs. In addition, while the processor 536 can access memory 542, in embodiments, other system components, such as the functions transformations block 532 and the correlator bank can access memory 542.

As discussed above slow signal arrival detection makes it very difficult to achieve fast frequency hopping in an environment requiring monitoring multiple communication systems such as an IOT environment that uses multiple PHYs. In a conventional non-coherent DSSS demodulator, the packet error rate sensitivity is limited by sync-word error rate (SER). The poor SER performance usually comes from the variation of initial frequency error estimation and initial timing detection. Embodiments described herein provide fast DSSS signal arrival detection for channel scan/switching and antenna diversity applications. Embodiments also provide more accurate initial timing and frequency offset estimation and more robust DSSS de-spreading to make the demodulator more sensitive. Fast and robust DSSS signal arrival detection allow near-instantaneous switching between Zigbee channels or from Bluetooth LE to Zigbee or Thread with little or no dropped communications. Embodiments, such as the DSSS demodulator illustrated in FIG. 5 provide a low cost, low power, and configurable correlator bank for DSSS demodulation.

As explained herein in more detail, DSSS signal arrival detection is accomplished within one preamble symbol. After one symbol detection, the correlator bank is re-configured on-the-fly to determine a coarse frequency offset. Signal arrival detection is then confirmed with a second preamble signal. Early exit provisions allow false detection to be dealt with quickly. After signal arrival detection is confirmed correlation length is then extended for robust initial timing detection. During the initial timing detection stage, the correlator bank is configured as matched FIR filters to process two function transformations of each of four symbols. That step improves reliability of initial timing detection and rejects unnecessary false detections. Further, after frequency offset estimation and timing detection, the correlator bank is re-configured as matched FIR filters on-the-fly to decode (despread) received DSSS symbols and track timing drift.

Figure 6:
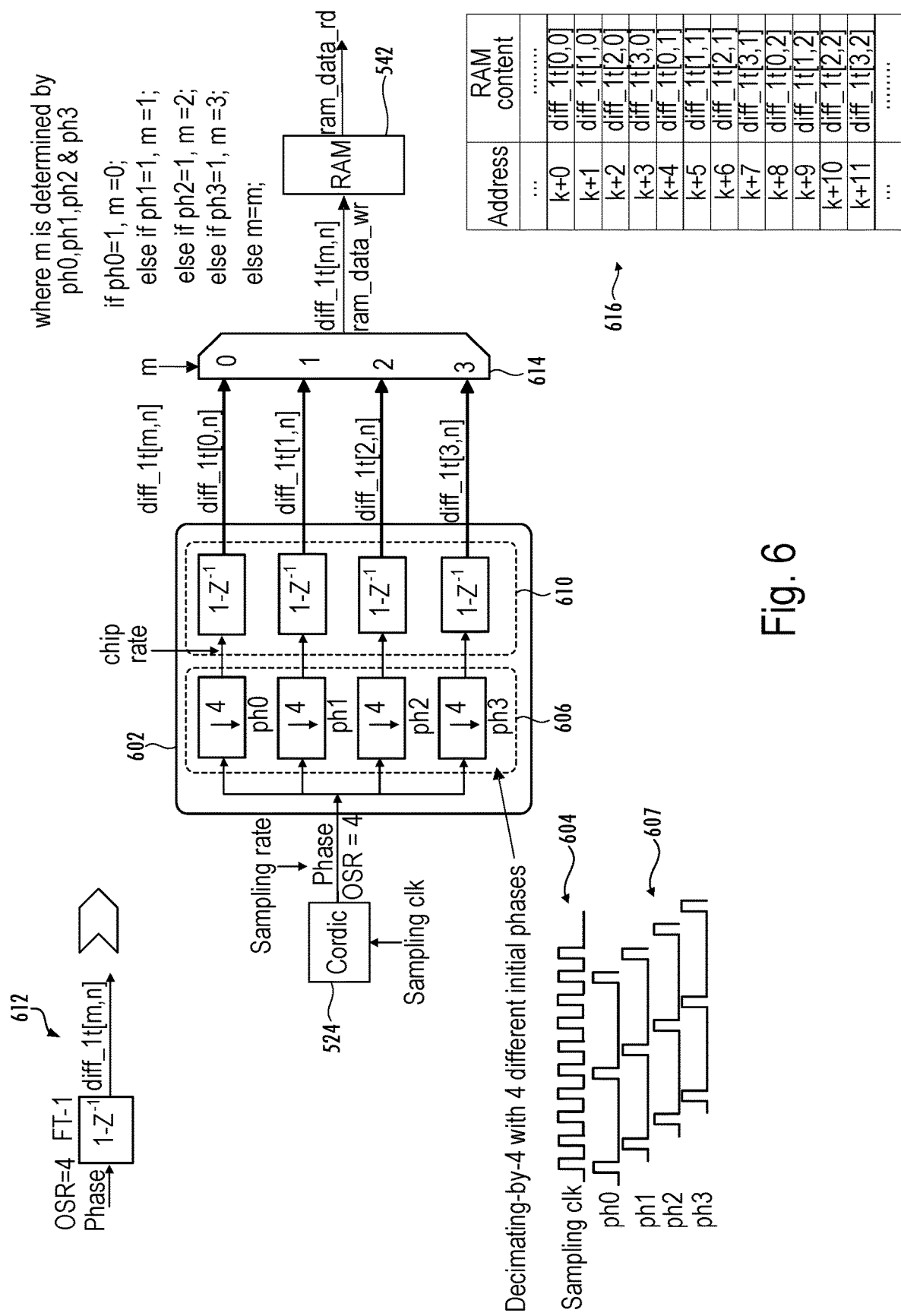
FIG. 6 illustrates the first function transformation (FT-1) and the sampling of the phase information used by FT-1 and other transformations and supplied by the Cordic.

FIG. 6 illustrates the first function transformation (FT-1), sampling of the phase supplied by the Cordic, and the data format in the memory 542 shown in FIG. 5. The Cordic 524 supplies the function transformations block 532 (a portion of which is shown at 602) with phase information. The transformations block 532 samples the phase data with an oversampling rate (OSR)=4 µsing the sampling clock shown at 604. The sampled phase data is decimated in the decimator blocks 606, which select samples for phase 0 (ph0), phase 1 (ph1), phase 2 (ph2), or phase 3 (ph3). The four phases are shown at 607. After decimating and selecting the desired phase, the decimator blocks 606 supply the FT-1 transformation blocks $(1-Z^{-1})$ 610 to transform the sampled phase information. As shown at 612, FT-1 calculates a difference between the current sample and the immediately preceding sample having the same phase to provide for 1 chip differential detection for four samples of the particular chip. The multiplexer 614 selects one of the outputs of the transformation blocks 610 according to the value of m, where m corresponds to the phase. Multiplexer 614 supplies memory 542 (shown as RAM) and the data is stored in memory as shown in 616, where m and n in diff_1t[m,n] indicate respectively, the phase and the chip being sampled and k is the base address in the memory. As shown in FIG. 5, the function transformation block 532 may supply output data directly to memory 542 or correlator bank 534.

As described previously, the transmitted RF signal is given by $$S_{RF}(t)=Re\{s(t)e^{j2\pi f_{ctx}t}\},$$

The received RF signal is converted to the baseband as $$S_{base}(t)=LPF\{S_{RF}(t)e^{j2\pi f_{crx}t}\},$$

where $f_{crx}$ is the carrier frequency at the receiver. Due to imperfect oscillators, there exists a non-negligible carrier frequency offset: $\in=f_{ctx}-f_{crx}$.

According to IEEE 802.15.4, the maximum transmitted carrier frequency offset is ±40 ppm. Hence, the worst-case frequency offset between two transceivers is ±80 ppm, corresponding, e.g., to ±40-ppm frequency offset in the transmitter and −40-ppm frequency offset in the receiver.

When a frequency offset does exist, the phase of the demodulated digital signals linearly increases or decreases with time and the slope of change is the frequency offset. In a short time period, after FT-1 performs one-chip differentiation of the phase signal, the frequency offset e is converted to a constant DC that overlaps on the frequency signal diff_1[m,n] used for the frequency offset estimation.

Referring to FIG. 7, in an embodiment the first received preamble symbol "0" 702 is used for the signal arrival detection and the coarse frequency offset estimation (FOE). The next preamble symbol 704, which follows the first preamble symbol is used to qualify the signal arrival detection and reject a false signal arrival detection. Coarse timing estimation and fine residual frequency offset estimation use the last two zero symbols of the preamble and the two SFD symbols (7A), which together have the value of [007A].

FIG. 8 illustrates the function transformations. In the embodiment illustrated in FIG. 8 there are eight function transformations FT-1 to FT-8. FT-1 performs one-chip differentiation $(1-z^{-1})$ to generate the phase difference diff_1t [m,n]=phase[4×n+m]−phase[4×n+m−4], where m varies inclusively between 0 and 3 cyclically, n is the sample number and the sample number increases by 1 for every cycle of m. For example, the table in FIG. 9 illustrates calculating diff_1t[m,n] for three samples (n=0, 1, 2, 3).

The value d_1t[m,n]=diff_1t[m,n]−FOE. FOE is set to zero for determination of the frequency offset estimate. Assuming phase[4×n+m] and d_1t[m,n] bit width are a 6-bit signed values, and the frequency deviation of IEEE 802.15.4 2.4 GHz Zigbee PHY in MSK is +/−500 kHz, the table in FIG. 10 shows how to map the value of d_1t[m,n] to frequency. For example, the angle $\pi/2$ of phase change is represented by 6′d16 and corresponds to a frequency value of 500 KHz. Without loss of generality, assuming FOE=0, then d_1t[m,n] is a one-chip phase differentiation (d_1t[m, n]=diff_1t[m,n]), as shown in FIG. 11. FT-2, FT-3, FT-4, FT-5 and FT-6 can be derived from d_1t[m,n] and correspond to 2 to 6 chip differentiation. FT-7 and FT-8 are special transformations described further herein.

Figure 12:
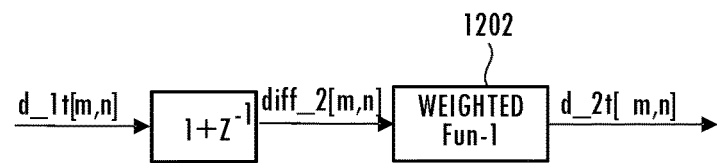
FIG. 12 illustrates the FT-2 transformation.
Figure 13:
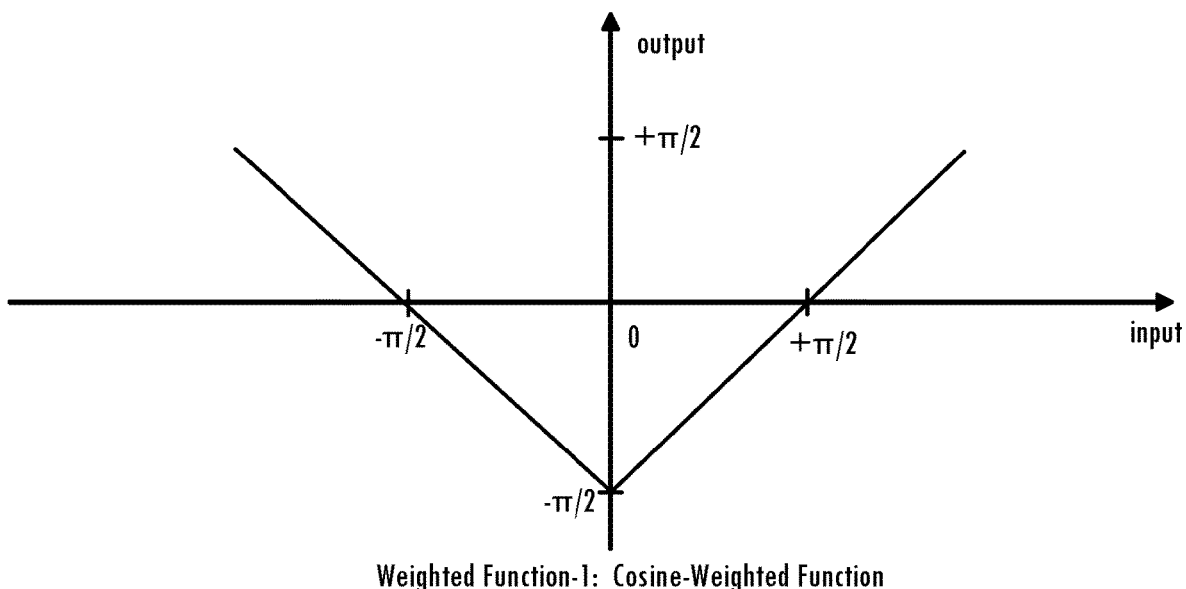
FIG. 13 illustrates the cosine weighted function used in FT-2.

FT-2 is a two-chip phase differentiation illustrated in FIG. 12. The first part of the second transformation diff_2[m,n]=d_1 [m,n]×$(1+z^{-1})$=phase[4×n+m]×$(1-z^{-1})$×$(1+z^{-1})$=phase[4×n+m]×$(1-z^{-2})$. When the detected frequency value is higher than an expected maximum frequency value, a nonlinear function (called Weighted Function-1) 1202 takes the phase difference per chip as input, and outputs an approximation. The value (diff_2[m,n] is supplied to Weighted Function-1 block 1202, which supplies the second transformation output d_2t[m,n]. FIG. 13 illustrates the cosine weighted function Weighted Function-1 showing the relationship of the cosine weighted function input and output.

Figure 14:
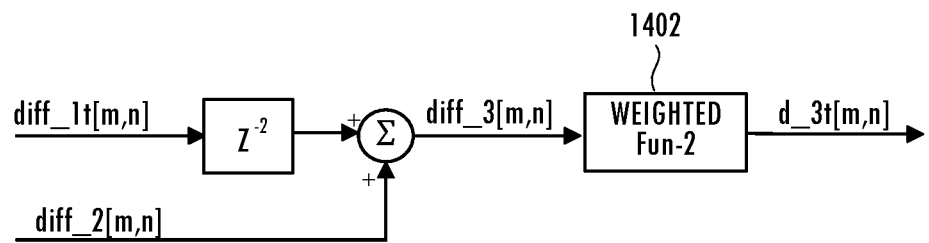
FIG. 14 illustrates the FT-3 transformation.

FIG. 14 illustrates the third transformation FT-3, which is a three-chip phase differentiation. The first part of the third transformation $$\text{diff\_3}[m, n] = (\text{diff\_1}[m, n] \times (z^{-2})) + \text{diff\_2}[m, n] =$$
$$\text{phase}[4 \times n + m] \times (1 - z^{-1}) \times (z^{-2}) + \text{phase}[4 \times n + m] \times (1 - z^{-2}) =$$
$$\text{phase}[4 \times n + m] \times (1 - z^{-3}).$$

Figure 15:
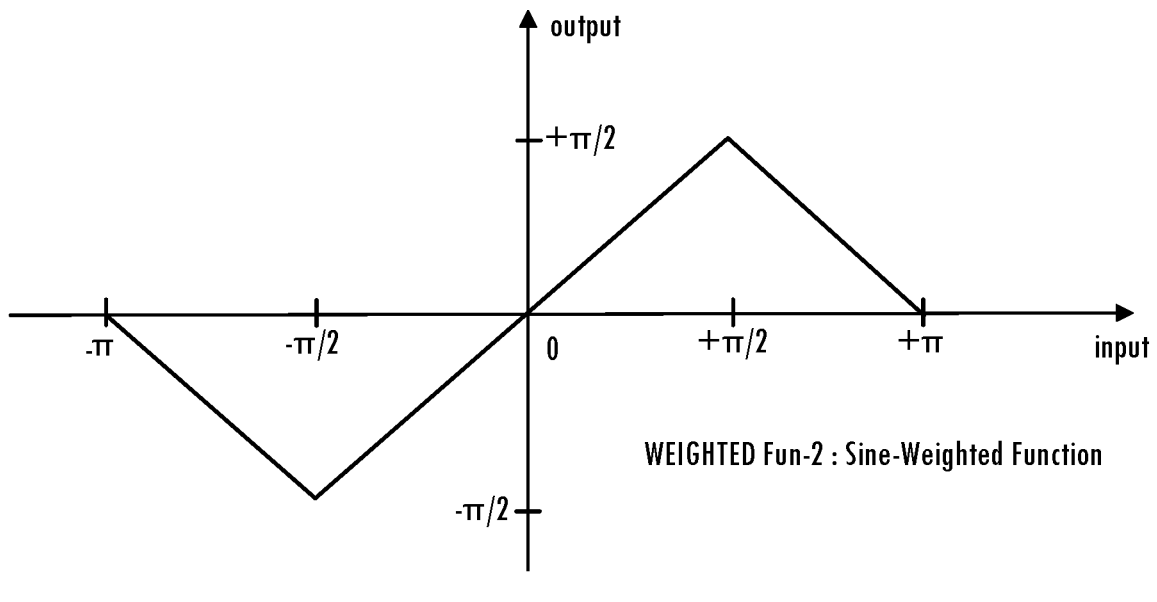
FIG. 15 illustrates the sine weighted function used in FT-3.

When the detected frequency value is higher than an expected maximum frequency value, another nonlinear function (called Weighted Function-2) 1402 takes the phase difference as the input, and outputs a likely approximation of that phase. The value (diff_3[m,n]) is supplied to Weighted Function-2 block 1402, which supplies the third transformation output d_3t[m,n]. FIG. 15 illustrates the sine weighted function Weighted Function-2 showing the relationship of the sine weighted function input and output. The sine and cosine weighted functions ensure that certain phase rotations are enhanced or reduced so one noisy sample does not dominate correlation.

Figure 16:
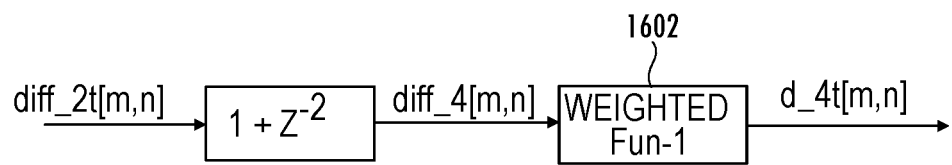
FIG. 16 illustrates the FT-4 transformation.

FIG. 16 illustrates the fourth transformation FT-4, which is a four-chip phase differentiation. The first part of the fourth transformation diff_4[m,n]=diff_2[m,n]× $(1+z^{-2})$=phase[4×n+m]×$(1-z^{-2})$×$(1+z^{-2})$=phase[4×n+m]× $(1-z^{-4})$. The value (diff_4[m,n]) is then supplied to a Weighted Function-1 block 1602, which supplies the fourth transformation output d_4t[m,n].

Figure 17:
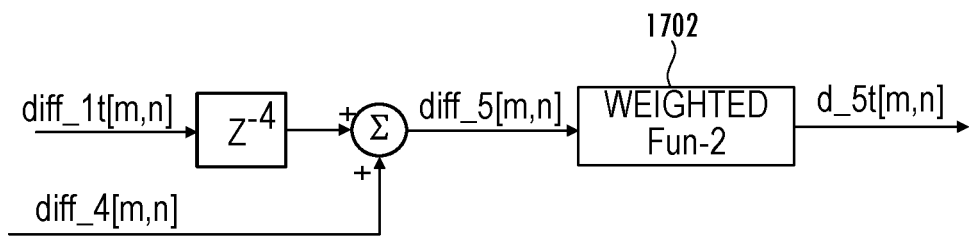
FIG. 17 illustrates the FT-5 transformation.

FIG. 17 illustrates the fifth transformation FT-5, which is a five-chip phase differentiation. The first part of the fifth transformation diff_5[m,n]=(diff_1[m,n]×$(z^{-4})$))+diff_4[m, n]=phase[4×n+m]*$(1-z^{-1})$×$(z^{-4})$+phase[4×n+m]× $(1-z^{-4})$=phase[4×n+m]×$(1-z^{-5})$.

The value (diff_5[m,n]) is then supplied to a Weighted Function-2 block 1702, which supplies the fifth transformation output d_5t[m,n].

Figure 18:
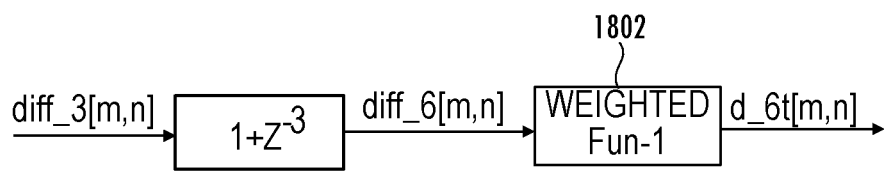
FIG. 18 illustrates the FT-6 transformation.

FIG. 18 illustrates the sixth transformation FT-6, which is a six-chip phase differentiation. The first part of the sixth transformation diff_6 [m,n]=diff_3[m,n]×$(1+z^{-3})$−phase[4× n+m]×$(1-z^{-3})$×$(1+z^{-3})$=phase[4×n+m]×$(1-z^{-6})$. The value (diff_5[m,n]) is then supplied to a Weighted Function-1 block 1802, which supplies the sixth transformation output d_6t[m,n].

Figure 19:
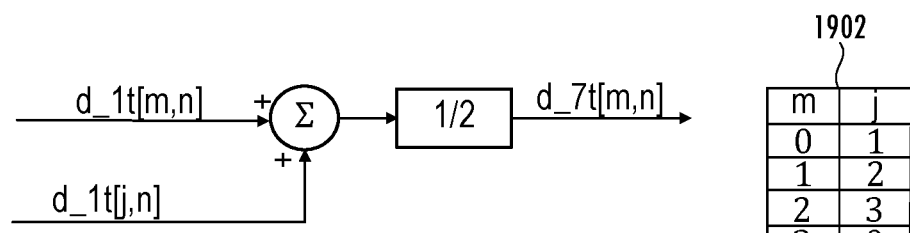
FIG. 19 illustrates the FT-7 transformation.

FIG. 19 illustrates the seventh transformation FT-7. FT-7 provides the average of two adjacent samples as shown in the table at 1902 where j=modulo(m+1,4). The modulo operation returns the remainder or signed remainder of a division, after one number is divided by another (called the modulus of the operation).

Figure 20:
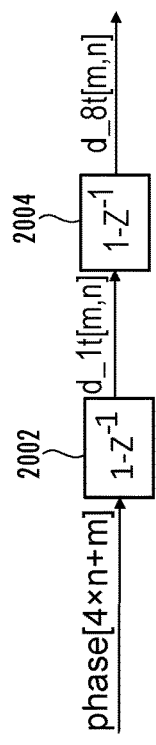
FIG. 20 illustrates the FT-8 transformation.
Figure 21:
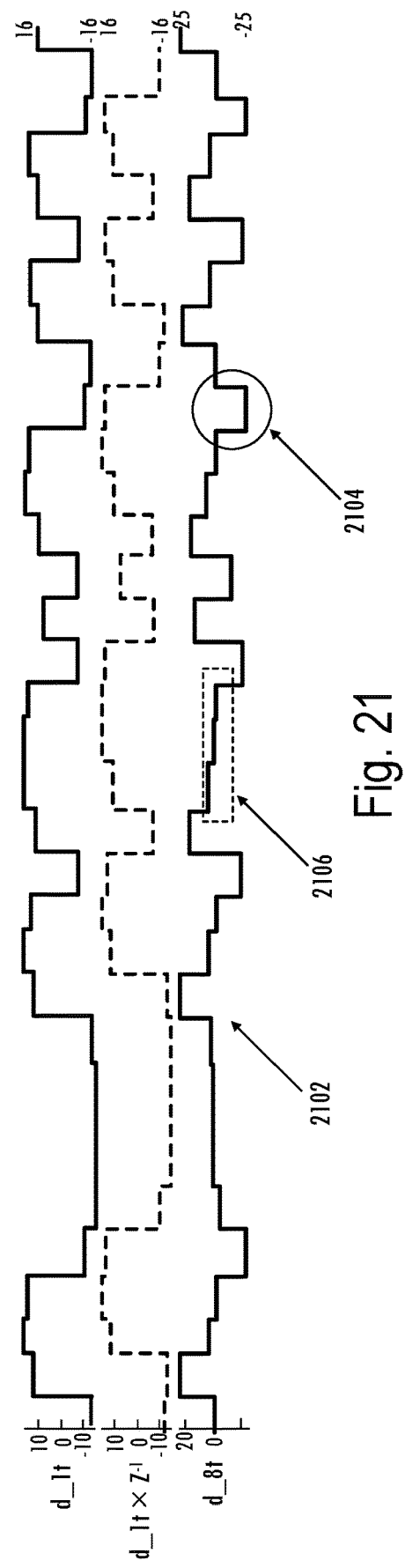
FIG. 21 is a graph illustrating the frequency deviation determined by the FT-8 transformation.

FIG. 20 illustrates the eighth transformation FT-8, which is a second differentiation of phase and includes a first differentiation stage 2002 and a second differentiation stage 2004. FIG. 21 illustrates the transformation FT-8. The signal d_1t peak to peak value corresponds to the frequency deviation. The second stage differentiator 2004 removes the DC component (caused by frequency offset between the transmitter and the receiver) in d_1t[m,n]. The FT-8 detector output d_8t shows the transitions of the frequency deviation. For example, the transition from negative frequency deviation to positive frequency deviation is shown by the pulse at 2102 and the transition from positive frequency deviation to negative frequency deviation is shown at 2104. Note that SNR affects the ripple amplitude as shown at 2106.

Figure 22:
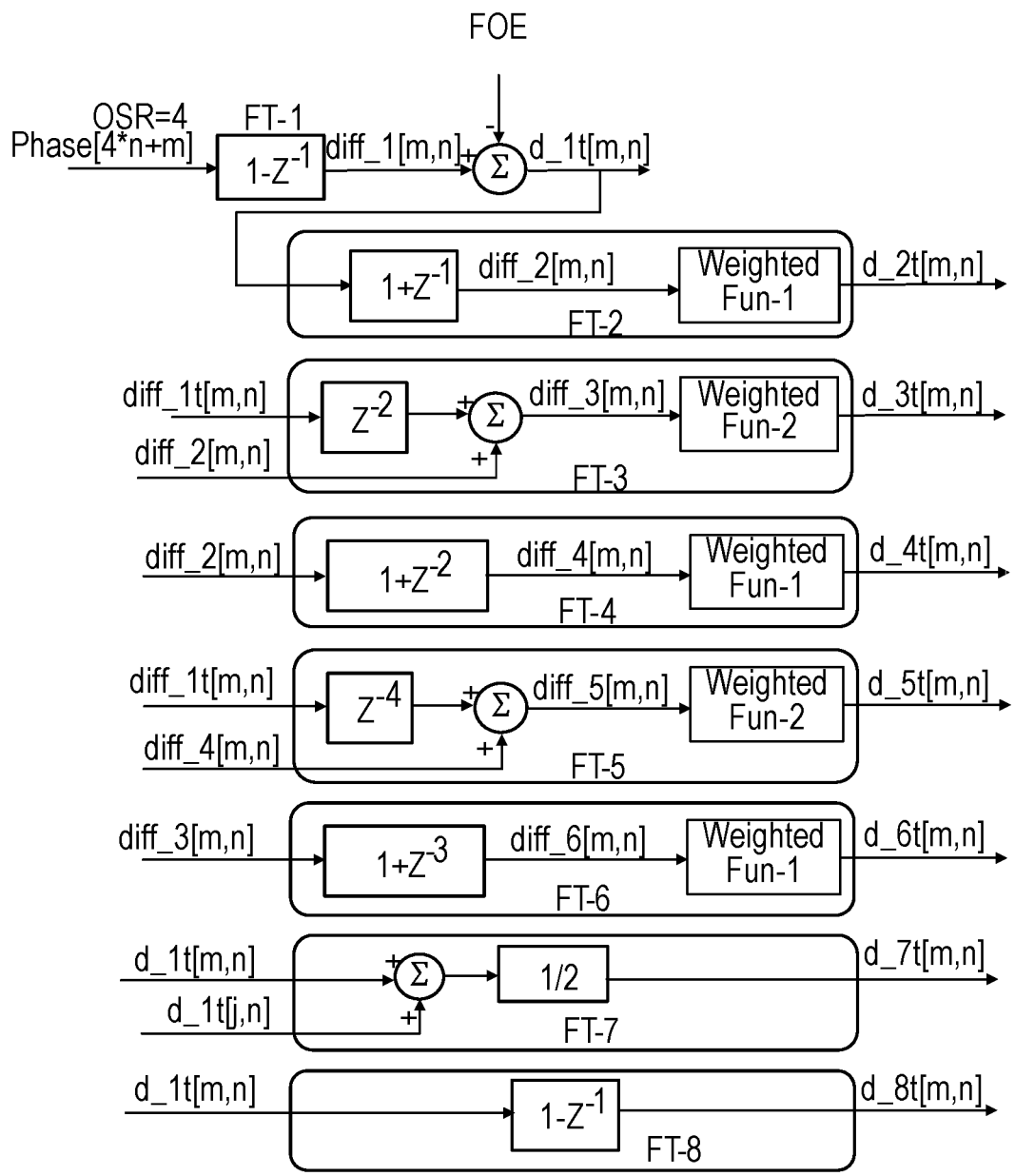
FIG. 22 illustrates the function transformations block with the various inputs and outputs of the function transformations FT-1 to FT-8.

FIG. 22 illustrates the function transformations block 532 with the various function transformations FT-1 to FT-8 illustrated. The function transformations block 532 may be implemented as digital logic to implement the function transformations described herein, as programmable logic such as a microcontroller, implemented in part by the DSSS processor 536, or by any appropriate combination of logic and programmable logic.

Figure 23:
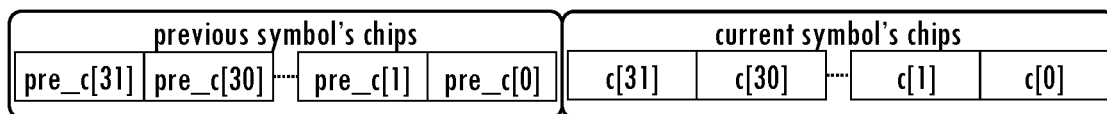
FIG. 23 illustrates a current and a previous symbol's chips used to determine the template signals for the DSSS MSK demodulator.

In IEEE 802.15.4 2.4 GHz OQPSK PHY Standard Symbol-to-Chip-Mapping shown in FIG. 1, the chip sequences representing each data symbol are modulated onto the carrier using O-QPSK with half-sine pulse shaping, which is equivalent to MSK modulation. Even-indexed chips are modulated onto the in-phase (I) carrier, and odd-indexed chips are modulated onto the quadrature-phase (Q) carrier. Symbol-to-Chip-Mapping Table-1 cannot be used in the DSSS MSK demodulator directly. The symbol-to-chip-mapping of "diff_1t" in the DSSS MSK demodulator can be derived from IEEE 802.15.4 2.4 GHz OQPSK PHY Standard Symbol-to-Chip-Mapping shown in FIG. 1. Assume the current symbol's chip sequence is c[k] and the previous symbol's chip sequence is pre_c[k], where 0<=k<=31. Also assume the variable oqpsk2msk[36:0] with 37 chips has five chips oqpsk2msk[36:32] that come from the previous symbol as illustrated in FIG. 23. Assume the Symbol-to-Chip-Mapping sequence of "d_1t" is c_1t[k], "d_2t" is c_2t[k], d_3t" is c_3t[k], _4t" is c_4t[k], d_5t" is c_5t[k], d_6t" is c_6t[k], d_7t" is c_7t[k], d_8t" is c_8t[k].

The following variables are defined:

$$oqpsk2msk[i], 0 <= i <= 36$$

$$oqpsk2msk\_q1[i], 0 <= i <= 35$$

$$oqpsk2msk\_q2[i], 0 <= i <= 34$$

$$oqpsk2msk\_q3[i], 0 <= i <= 33$$

$$oqpsk2msk\_q4[i], 0 <= i <= 32$$

$$oqpsk2msk\_q5[i], 0 <= i <= 31$$

The first step is the calculation of oqpsk2msk[i] as shown at 2402 in FIG. 24A where the operator "" is an XOR and "!" negates the XOR result. First oqpsk2msk[36:31] are calculated. Then oqpsk2msk[30:0] are calculated as shown at 2404. Then, oqpsk2msk_q1–oqpsk2msk_q5 are calculated as shown at 2406. Finally, in step 2 as shown in FIG. 24B, c_1t[k], c_2t[k], c_3t[k], c_4t[k], c_5t[k], c_6t[k], c_7t[k], c_8t[k] are calculated. Those values function as the template symbols used in the correlator bank.

Figure 25:
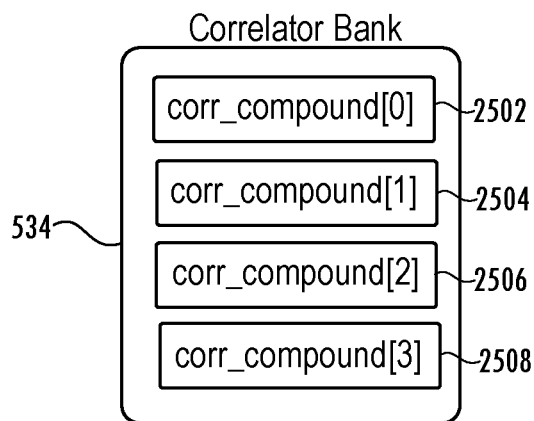
FIG. 25 illustrates a high level block diagram of an embodiment of the correlator bank being formed of four correlator compounds.
Figure 26:
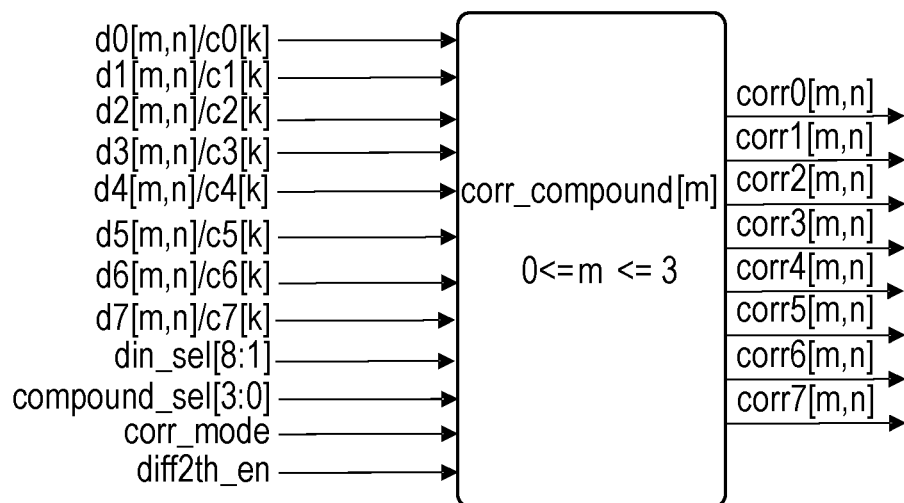
FIG. 26 illustrates inputs and outputs of an example correlator compound.

FIG. 25 illustrates a high level block diagram of the bank of correlators 534 showing the correlator bank has four identical correlator compounds, corr_compound[0:3], also referred to herein simply as correlators. Each correlator (or correlator compound) receives samples from one of the m phases illustrated in FIG. 6. FIG. 26 illustrates the inputs and outputs to a correlator compound. The inputs include the signals d0[m,n]–d7[m,n] and the corresponding template signals c0[k]-c7[k]. In addition, each correlator compound receives the control signals din_sel[8:1], compound_sel[3:0], corr-mode, and diff2th_en. Asserting corr-mode turns one of the elements into an average filter. Setting diff2th_en=1, causes the correlation in element[7] to calculate the correlation corresponding to the transitions of frequency deviation as explained further herein. The control signals are described further herein. Each correlator compound supplies correlator compound outputs corr0[m,n] to corr7[m,n].

Figure 27A:
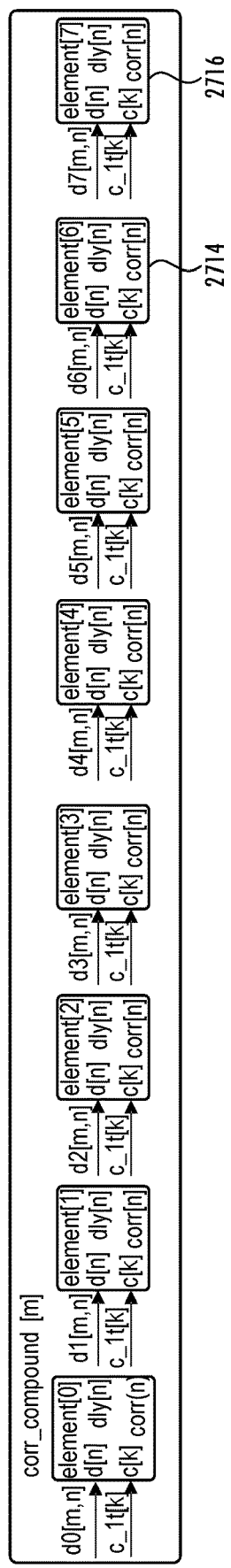
FIG. 27A illustrates the eight element blocks of an embodiment of an example correlator compound.
Figure 27B:
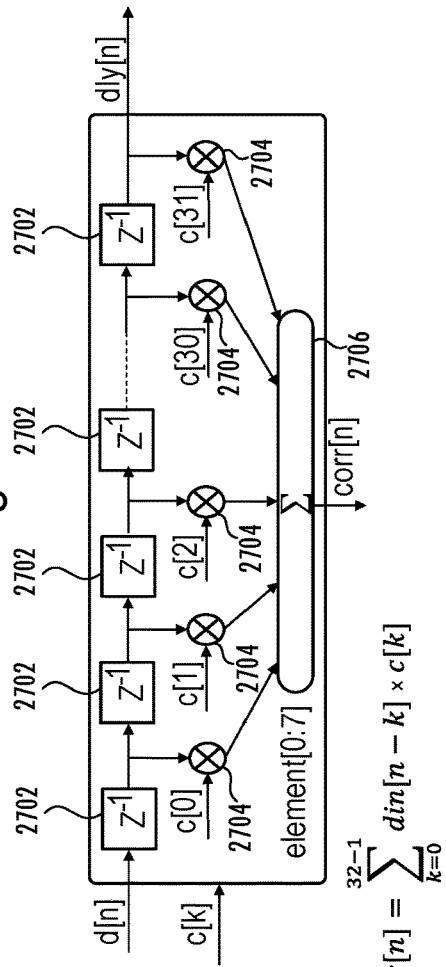
FIG. 27B illustrates additional details of an embodiment of an element block.

Referring to FIG. 27A, each correlator compound[m] has eight element blocks element[0:7]. The eighth element (element[7]) supports a special correlation function described further herein. FIG. 27B illustrates additional details of each element. Each element is a matched finite impulse response (FIR) filter with length M=32 (order 31). Remember that there are 32 chips per symbol. The matched filter computes true correlation of the received signal din[n] with the template signal c[k] for the duration of the whole symbol sequence. Each delay block 2702 supplies an output to a multiplication block 2704, which multiplies the value in block 2702 with the corresponding template signal c[k]. The multiplication in the correlator can be implemented simply as an inversion of the delay block input to the multiplier conditioned on the single bit value of the template c[k]. That is, an inversion results from the single bit value of 0 and a no inversion with a single bit value of 1. The multipliers 2704 supply their outputs to the summation block 2706, which supplies the element output corr [n]. Setting corr_mode=1 sets the correlation coefficients to "1" and the correlation function turns into average function. The multiplication in the element is bypassed and the matched FIR filter becomes an average filter. The average filter is used to estimate the frequency offset. As discussed above, when a frequency offset exists, the phase of the demodulated digital signals linearly increases or decreases with time. The slope of the change in phase is the frequency offset. In a short time period, after FT-1 performs one-chip differentiation of the phase signal, the frequency offset e is converted to a constant DC that overlaps on the frequency signal diff_1[m,n]. If no frequency offset exists, the sum of all chips of diff_1[m,n] within one preamble symbol will be a small constant bias. That bias is caused by an unbalanced symbol-to-chip sequence in the preamble symbol. The frequency offset can be estimated by calculating the average of all chips of diff_1[m,n].

Figure 28:
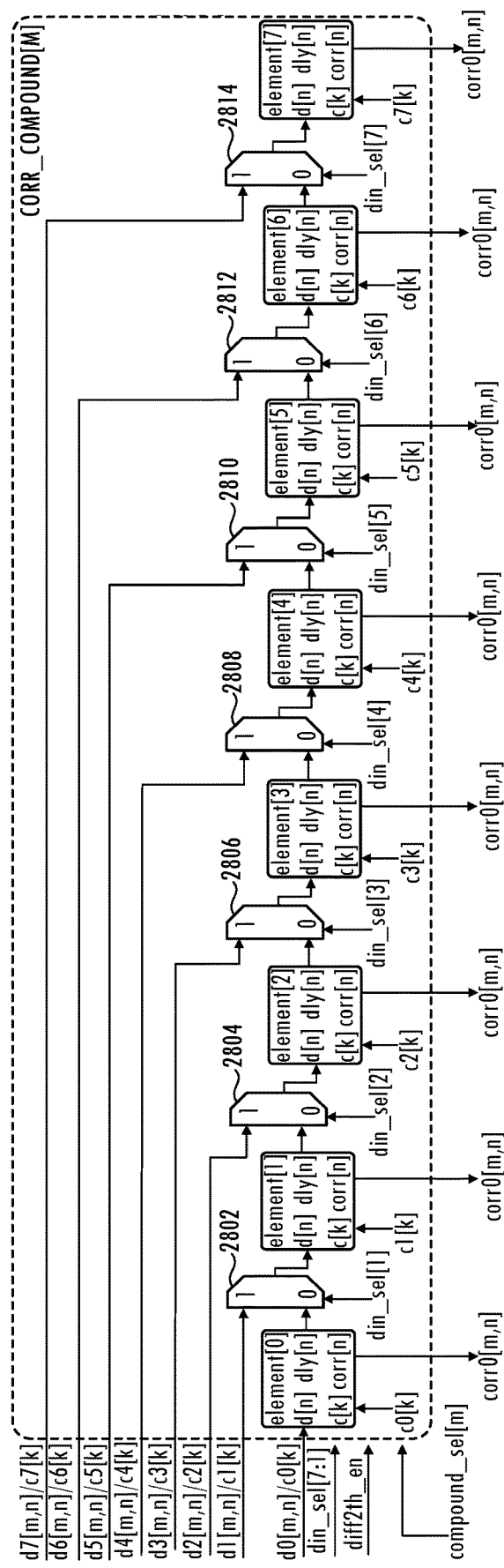
FIG. 28 illustrates additional details of the structure of an embodiment of a correlator compound.

FIG. 28 illustrates additional details of the structure of a correlator compound[m]. The elements can each have their own data input (d7 to do) or the eight elements can be configured to cascade, e.g., a cascade of four or eight symbols, by setting the select signals din_sel[7:1] for multiplexers 2802 to 28014 to appropriate values. For example, for a four symbol cascade, multiplexer 2802 selects the dly[n] output from element[0] as the input to element[1], multiplexer 2804 selects the dly[n] output from element[1] as the input to element[2], multiplexer 2806 selects the dly[n] output from element[2] as the input to element[3]. For the second four element cascade, multiplexer 2808 selects the d4[m,n] as the input for element[4], multiplexer 2810 selects the dly[n] output from element[4] as the input to element[5], multiplexer 2812 selects the dly[n] output from element[5] as the input to element[6], and multiplexer 2814 selects the dly[n] output from element[6] as the input to element[7].

Figure 29A:
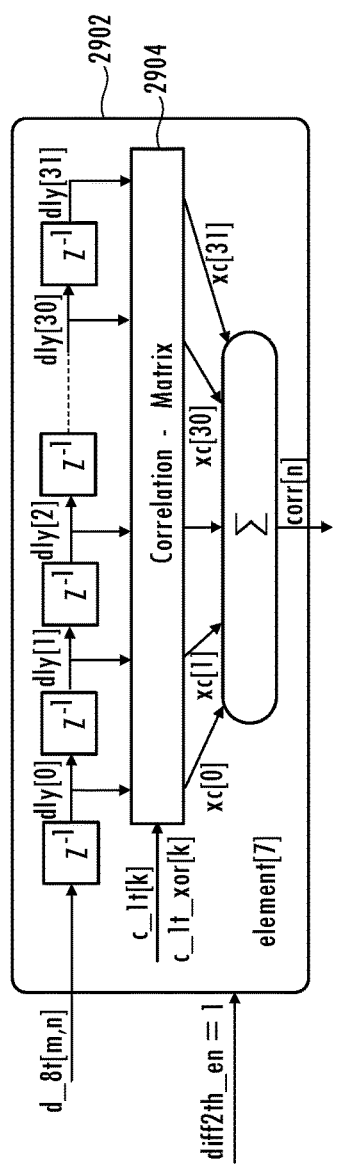
FIG. 29A illustrates element[7] configured in a special mode that is used to correlate the transitions of frequency deviation.

FIG. 29A illustrates element[7] 2902 configured in a special mode that is used correlate the transitions of frequency deviation. The special mode is in addition to the matched FIR filter mode and is activated by asserting diff2th_en. Referring back to FIG. 20, the eighth transformation provides a second differentiation of phase. The eighth transformation is supplied as the input d_8t[m,n] to element[7]. Each of the delay blocks ($z^{-1}$) supplies an output to the correlation matrix 2904. The correlation matrix also receives the template signal c_1t[k], which corresponds to d_1t[m,n], and a modified template signal c_1t_xor[k], which corresponds to transitions of frequency deviation.

Figure 29B:
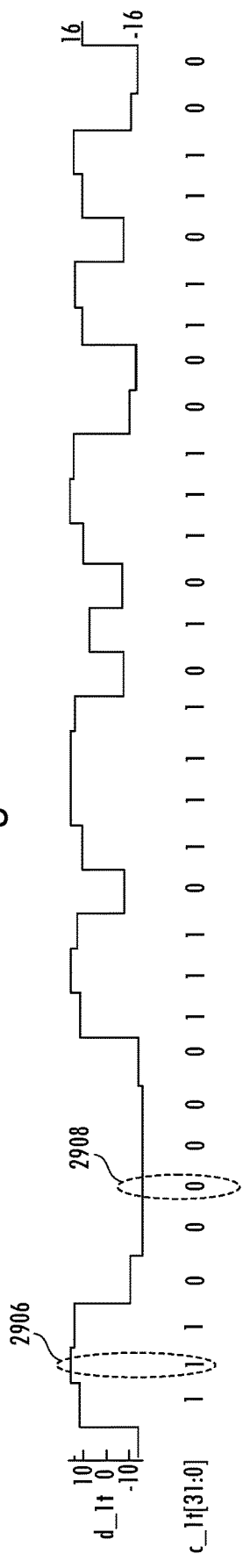
FIG. 29B illustrates the correlation of the first transformation FT-1 and the template signal corresponding thereto.

FIG. 29B illustrates the correlation of d_1t and c_1t[k] for a matched filter mode correlation, where c_1t[k] is the template signal corresponding to d_1t for a preamble signal. The value d_1t is the first transformation shown, e.g., in FIG. 8. Remember that the multiplication in the correlator works by negating the input to the multiplier if c[k] is 0 and otherwise not. Thus, at 2906 with a d1_t value of 16 and with a c[k]=1, no inversion occurs resulting in a multiplier output of 16 and at 2908 with a c[k] value of zero and a d_1t value of -16, the inversion takes place also resulting in an output of 16.

Figures 29C, 29D:
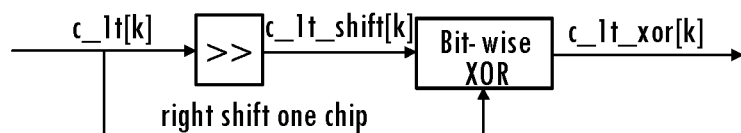
FIG. 29C illustrates generation of the modified template signal for use with the special mode of element[7].
FIG. 29D illustrates code for generation of the modified template signal for use with the special mode of element[7]

FIG. 29C illustrates generation of the modified template signal for use with diff2th_en=1. The template signal c_1t[k] is right shifted one chip and the shifted value is bit-wise XORed with c_1t[k] to obtain c_1t_xor[k]. FIG. 29D shows code illustrating generation of the modified template signal.

Figure 30:
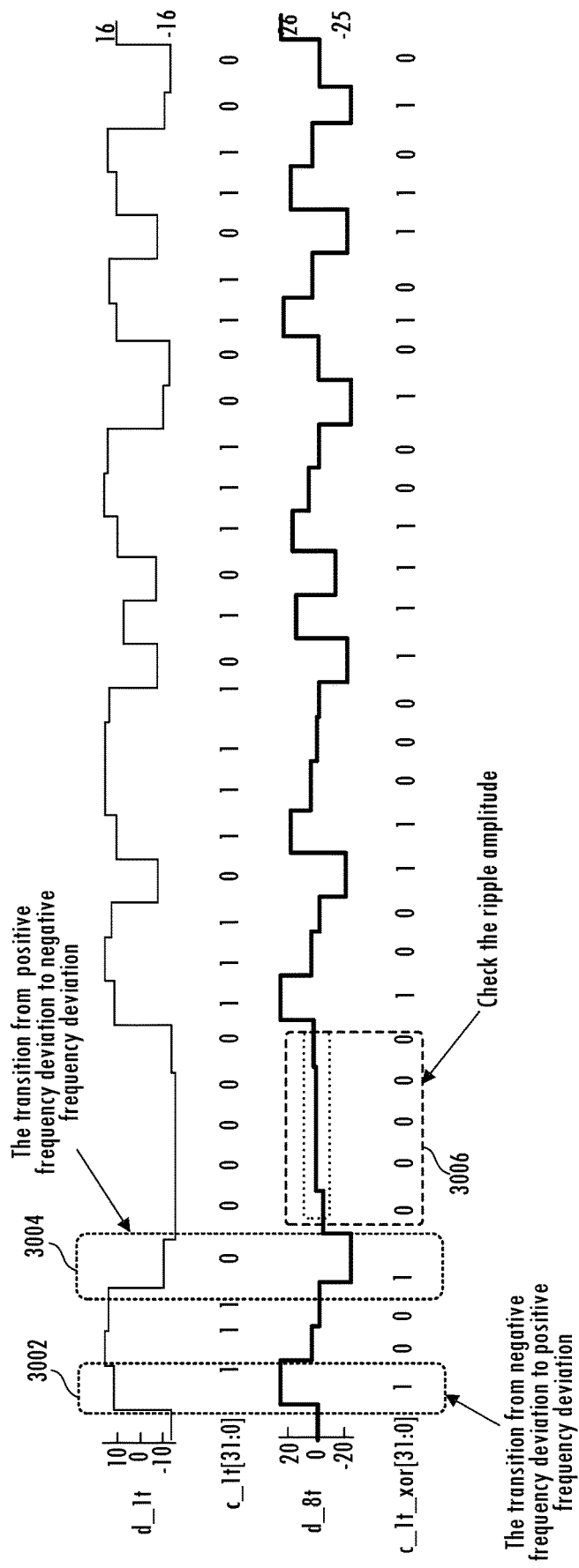
FIG. 30 illustrates graphically how the modified template code corresponds to frequency deviation transitions indicated in the FT-8 transformation.

FIG. 30 illustrates graphically how the template code c_1t_xor[k] corresponds to frequency deviation transitions indicated in d_8t. A c_1t_xor[k] value of one corresponds to a frequency deviation transition. For example, at 3002, c_1t_xor is a one corresponding to the transition from a negative frequency deviation to a positive frequency deviation. At 3004, c_1t_xor is also a one corresponding to the transition from the positive frequency deviation to a negative frequency deviation.

FIG. 31 illustrates how the template code c_1t_xor[k] is interpreted in the correlation matrix 2904. A "1" corresponds to transitions of frequency deviation. If c_1t_xor[k] is "0" then d_8t[k] is checked to see if ripple, caused by noise energy, is within the bounds of ±ripple_th as shown in FIG. 31. Referring back to FIG. 30, the ripple to be checked is shown at 3006. If the ripple is within bounds, the inside_range [k] is set to "1" and if not within those bounds, inside_range [k] is set to 0. The table 3102 illustrates how the correlation is calculated. If c_1t_xor[k] is a 1 and c_1t[k] is a 1, then xc[k]=dly[k], where dly[k] is the output from the delay block and xc[k] is the output from the correlation matrix, both of which are shown in FIG. 29A. If c_1t_xor[k] is a 1 and c_1t[k] is a 0, then xc[k]=–dly[k]. If c_1t_xor[k] is "0", then if d_8t[k] is inside range, xc[k] is set to 16 and if not in range xc[k] is set to –16. Note that xc[k] being set to ±16 assumes the angle and frequency values shown in the table at 3104. The special correlator configuration provides the sum of xc [0:31] as the correlation output corr [n].

Figure 32A:
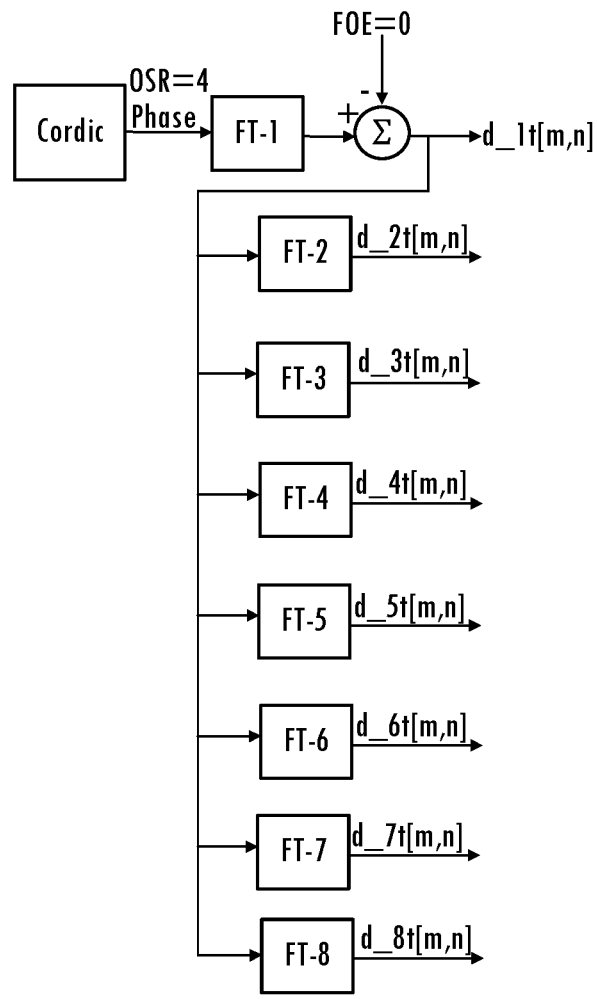
FIG. 32A illustrates the function transformations used for the first correlator bank configuration CBC-1.
Figure 32B:
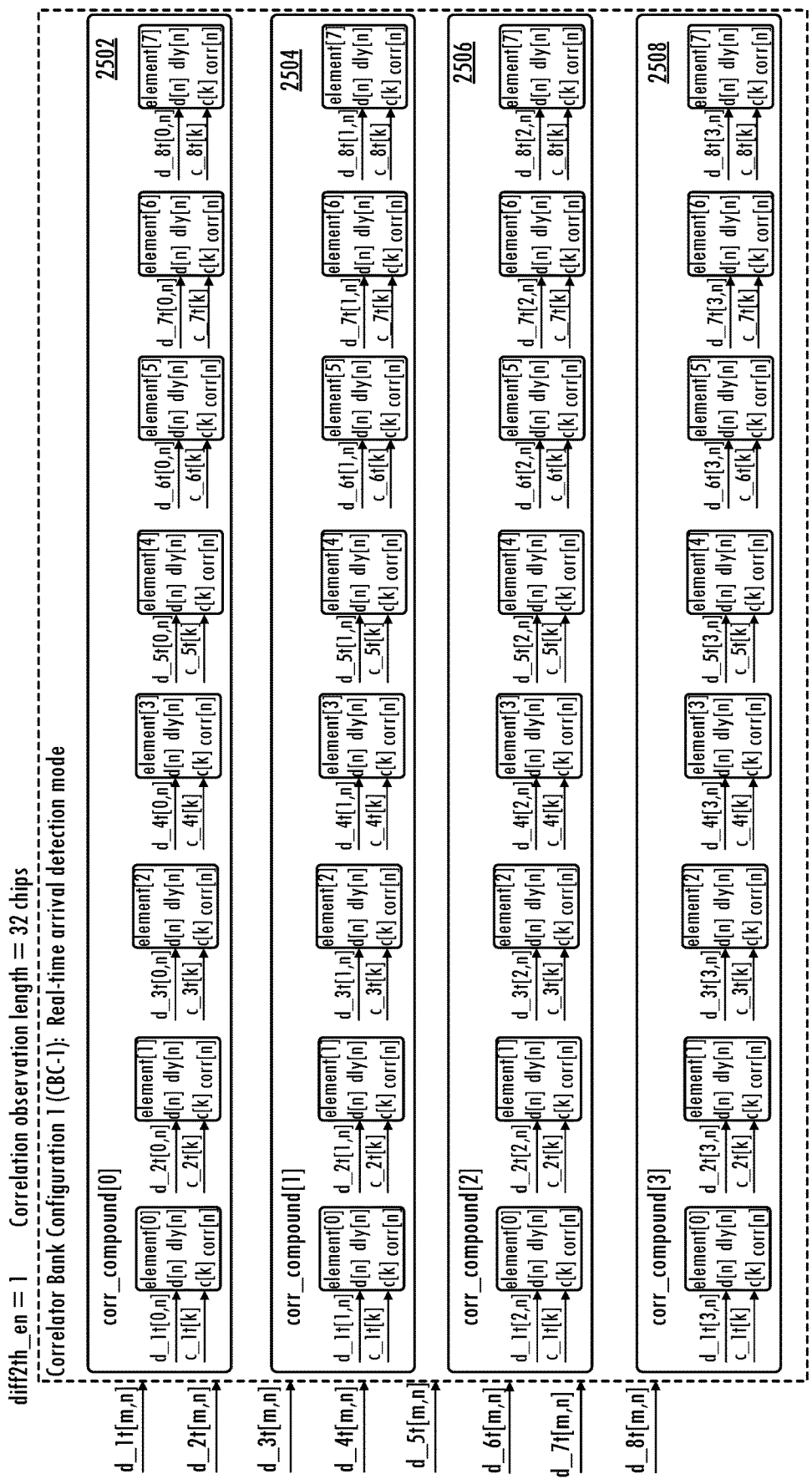
FIG. 32B illustrates the first correlator bank configuration CBC-1.

The correlator bank 534 utilizes various ones of the transformations depending on the particular correlation task at hand. The correlator bank supports a number of different configurations that can be changed on-the-fly to support fast DSSS signal arrival detection, more accurate frequency offset estimation and timing, and more robust DSSS despreading. Initially, the correlator bank is configured to accomplish DSSS signal arrival detection with one preamble symbol. FIGS. 32A and 32B illustrate the first correlator bank configuration (CBC-1), which is used for signal arrival detection. All four correlator compounds are enabled for CBC-1. FIG. 32A shows the outputs d_1t[m,n] through d_8t[m,n] of the 8 function transformation blocks FT-1 to FT-8 used in CBC-1. For CBC-1, diff2th_en=1, meaning element[7] of each correlator compound is configured into the special mode for detecting transitions of frequency deviation. Referring to FIG. 32B, each element receives an output from a different function transformations block. Element[0] of correlator compound[0] receives d_1t[0,n] and the corresponding template signals c_1t[k], element[1] receives d_2t[0,n], and the corresponding template signals c_2t[k], etc. Element[0] of correlator compound[1] receives d_1t[1,n] and the corresponding template signals c_1t[k], element[1] receives d_2t[1,n], and the corresponding template signals c_2t[k], etc. Element[0] of correlator compound[2] receives d_1t[2,n] and the corresponding template signals c_1t[k], element[1] receives d_2t[2,n], and the corresponding template signals c_2t[k], etc. Element[0] of correlator compound[3] receives d_1t[3,n] and the corresponding template signals c_1t[k], element[1] receives d_2t [3,n], and the corresponding template signals c_2t[k], etc. The correlator compounds receive inputs generated by one of the m phases shown in FIG. 6. The use of the eight function transformations for CBC-1 helps fast and accurate detection of the first symbol. CBC-1 is used for real time detection. Referring back to FIG. 5, the data is coming straight from the function transformations block 532, which is receiving real time data from the Cordic. In other correlator bank configurations, data is retrieved from memory rather than using real-time data.

Figure 33:
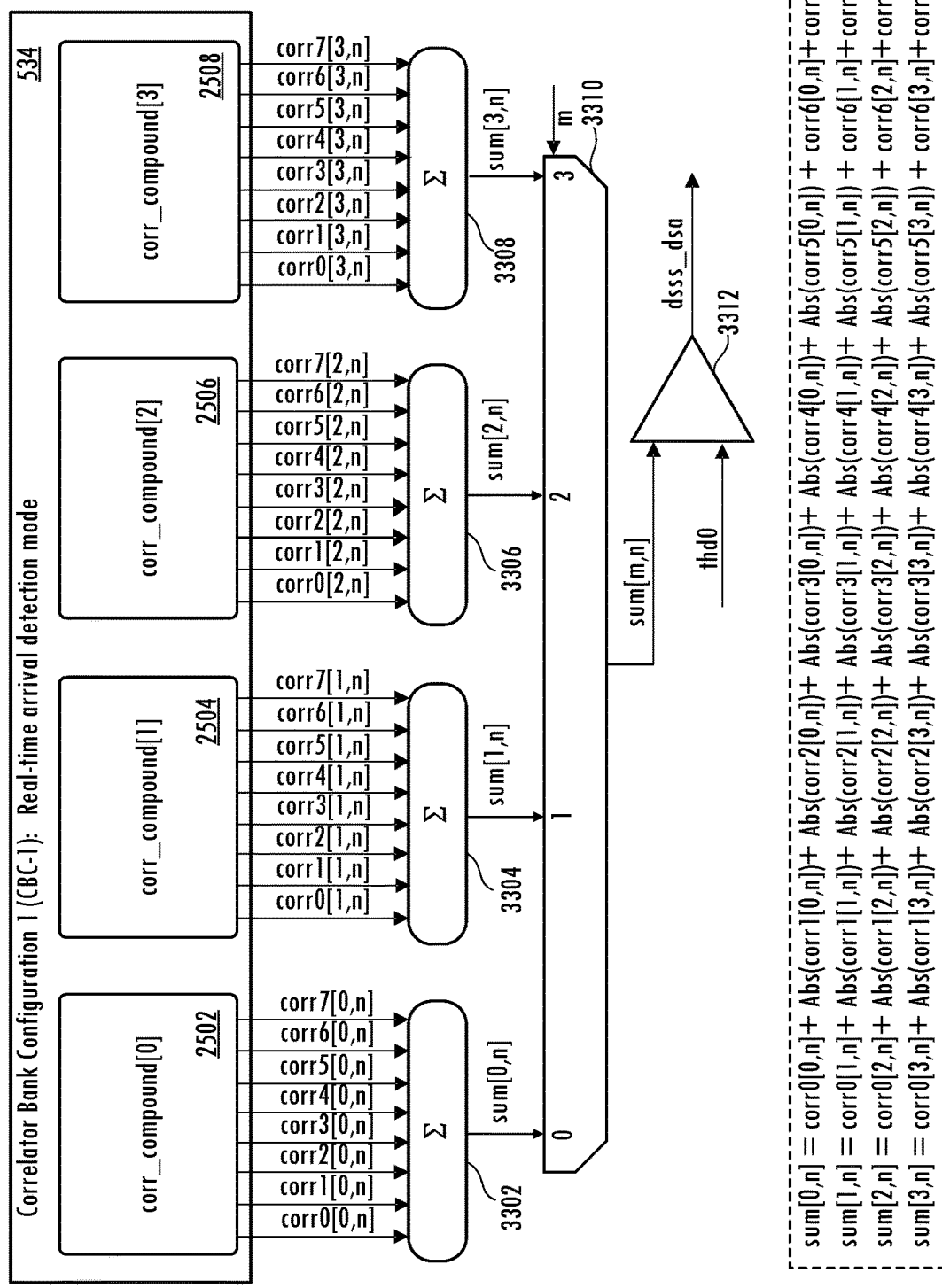
FIG. 33 illustrates another aspect of CBC-1, which is used for real-time arrival detection mode.

FIG. 33 illustrates another aspect of CBC-1 used for real-time arrival detection mode. Each correlator compound 2502 through 2508 generates correlator outputs corr [m,n], which are supplied to summation blocks 3302, 3304, 3306, and 3308. The outputs from the summation blocks (sum[m, n]) are supplied to the selector circuit 3310 that selects one of the correlator outputs according to the value of the control signal "m", where m corresponds to one of the four phases. Each correlator output is compared to a threshold value thd0 in comparator 3312. If at least one of the correlator outputs is greater than the threshold value, then a preamble symbol has been detected and the correlator bank then looks for a second preamble symbol to confirm signal detection The summations for the outputs of the correlator are shown at 3314. Note that correlator outputs corr1, corr2, corr3, corr4, and corr5 take the absolute value to account for frequency offset that may be present and has not been accounted for yet during the initial detection of the first symbol. Note that while summation blocks 3302-3308 are shown as external to the correlator compounds, that functionality may be part of the correlator compounds, the correlator bank, or external to both. In addition, while multiplexer 3310 and comparator 3312 are shown as being external to the correlator bank, that functionality may be part of the correlator bank. In embodiments, at least some of the functionality described in FIG. 33 that is not in the correlator bank is performed by the dsss_processor 536 (see FIG. 5).

Figure 34:
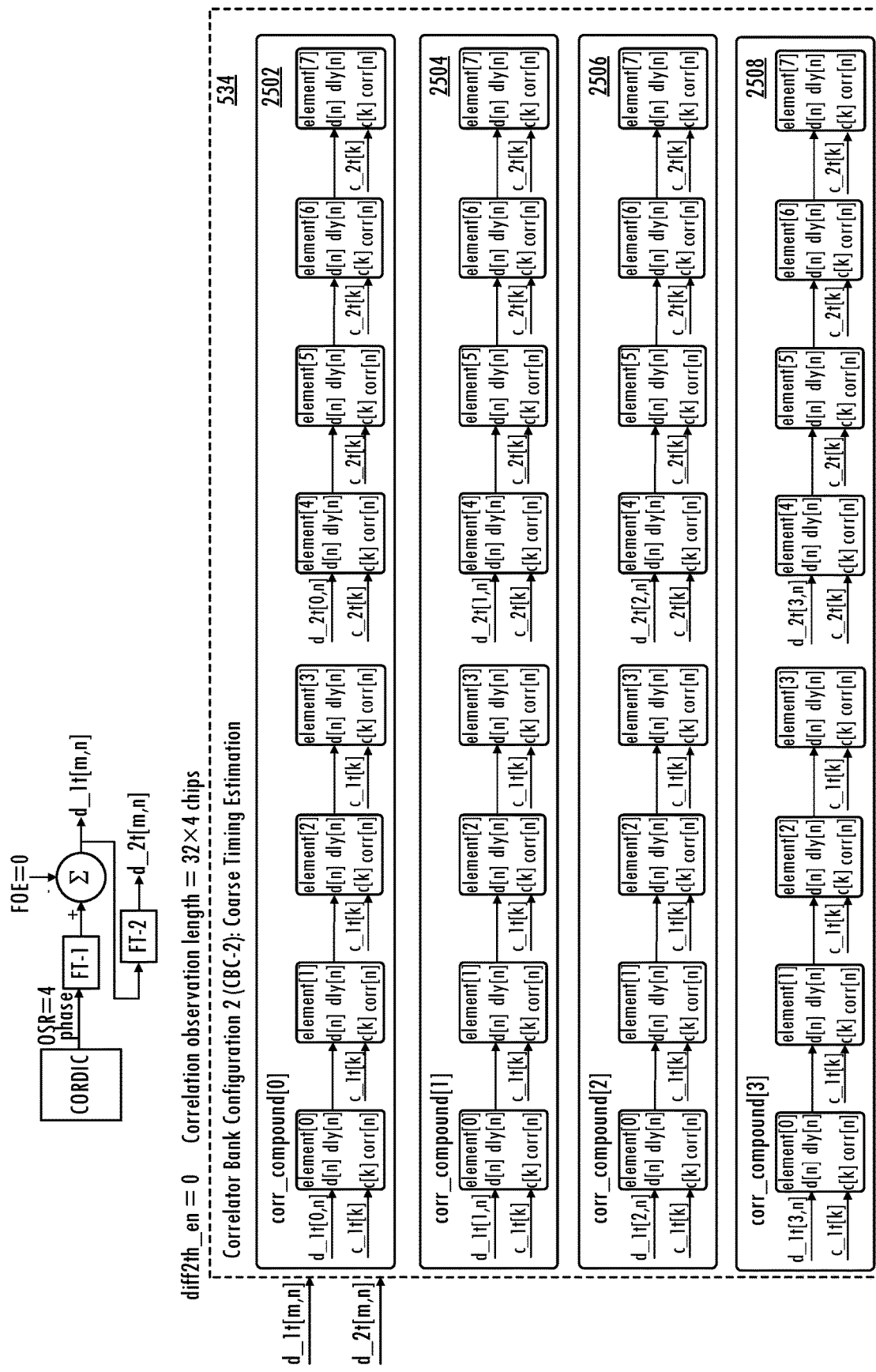
FIG. 34 illustrates the second correlator bank configuration CBC-2.

FIG. 34 illustrates the second correlator bank configuration (CBC-2) used for coarse timing estimation. All four correlator compounds are enabled for CBC-2 and the correlator compounds receive real-time data. FIG. 34 shows the outputs d_1t[m,n] and d_2t[m,n] being generated by function transformation blocks FT-1 and FT-2 and supplied to the correlator bank 534 for CBC-2. For CBC-2, diff2th_en=0, meaning element[7] of each correlator compound is configured as a matched FIR filter. The first four elements (elements [0:3]) in each correlator compound are cascaded as are the last four elements (elements [4:7]). The correlation observation length is four symbols, which equals (32×4) chips. Thus, each correlator element in the first four elements receives the function transformation FT-1 corresponding to one of the four symbols, and each correlator element in the last four elements receives the function transformation FT-2 corresponding to one of the four symbols. Specifically, element[0] of correlator compound[0] receives d_1t[0,n] and the corresponding template signal c_1t[k], element[1] receives the dly[n] output signal from element[0], and the corresponding template signals c_1t[k], etc. Element[4] of correlator compound[0] receives d_2t[0,n] and the corresponding template signal c_2t[k], element[1] receives the dly[n] output signal from element[0], and the corresponding template signal c_2t[k], etc. Element[0] of correlator compound[1] receives d_1t[1,n] and the corresponding template signal c_1t[k], element[1] receives the dly[n] output signal from element[0], and the corresponding template signals c_1t[k], etc. Element[4] of correlator compound[1] receives d_2t[1,n] and the corresponding template signal c_2t[k], element[1] receives the dly[n] output signal from element [0], and the corresponding template signal c_2t[k], etc. Element[0] of correlator compound[2] receives d_1t[2,n] and the corresponding template signal c_1t[k], element[1] receives the dly[n] output signal from element[0], and the corresponding template signals c_1t[k], etc. Element[4] of correlator compound[2] receives d_2t[2,n] and the corresponding template signal c_2t[k], element[1] receives the dly[n] output signal from element[0], and the corresponding template signal c_2t[k], etc. Element[0] of correlator compound[3] receives d_1t[3,n] and the corresponding template signal c_1t[k], element[1] receives the dly[n] output signal from element[0], and the corresponding template signals c_1t[k], etc. Element[4] of correlator compound[3] receives d_2t[3,n] and the corresponding template signal c_2t[k], element[1] receives the dly[n] output signal from element [0], and the corresponding template signal c_2t[k], etc. Note that as shown in FIG. 34, the frequency offset estimation (FOE) is set to 0 for generation of d_1t[m, n] for the coarse timing estimate. The template signals supplied to each element correspond to the symbol being correlated in that element.

Figure 35:
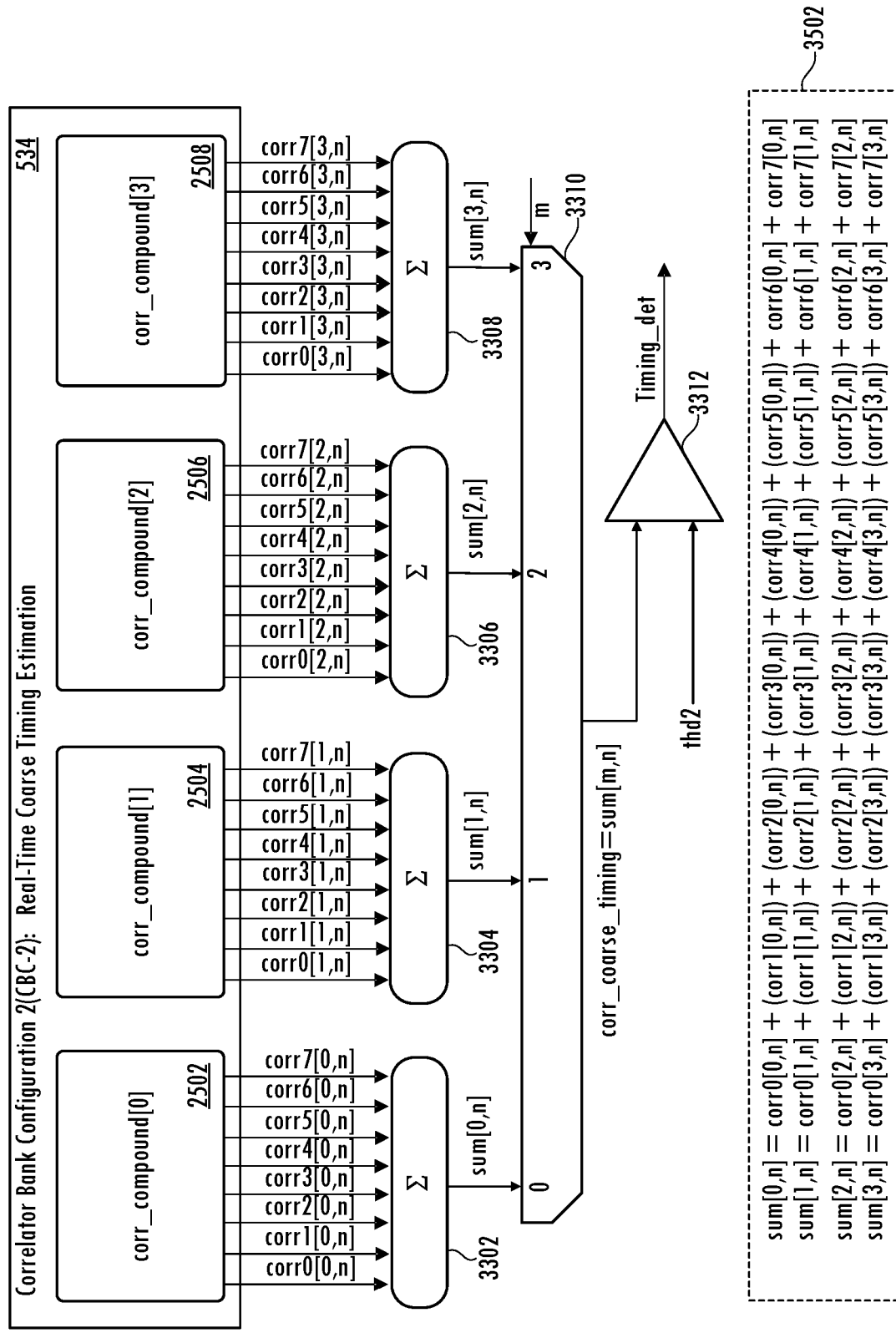
FIG. 35 illustrates another aspect of CBC-2, which is used for coarse timing estimation.

FIG. 35 illustrates another view of CBC-2 used for real-time coarse timing estimation. The correlator compounds 2502 through 2508 generate correlator outputs corr0 [m,n] to corr7[m,n], which are supplied to summation blocks 3302, 3304, 3306, and 3308. The outputs sum[m,n] from each of the summation blocks are supplied to the selector circuit 3310, which selects one of the correlator outputs according to the value of the control signal "m", where m corresponds to one of the four phases. Each correlator output is compared to a threshold value thd2 in comparator 3312. The comparator output is used for coarse timing estimation. The summations for the outputs of the correlator are shown at 3502. Note that correlator outputs do not need to take the absolute value as a coarse frequency offset correction has already occurred as explained further herein.

Figure 36:
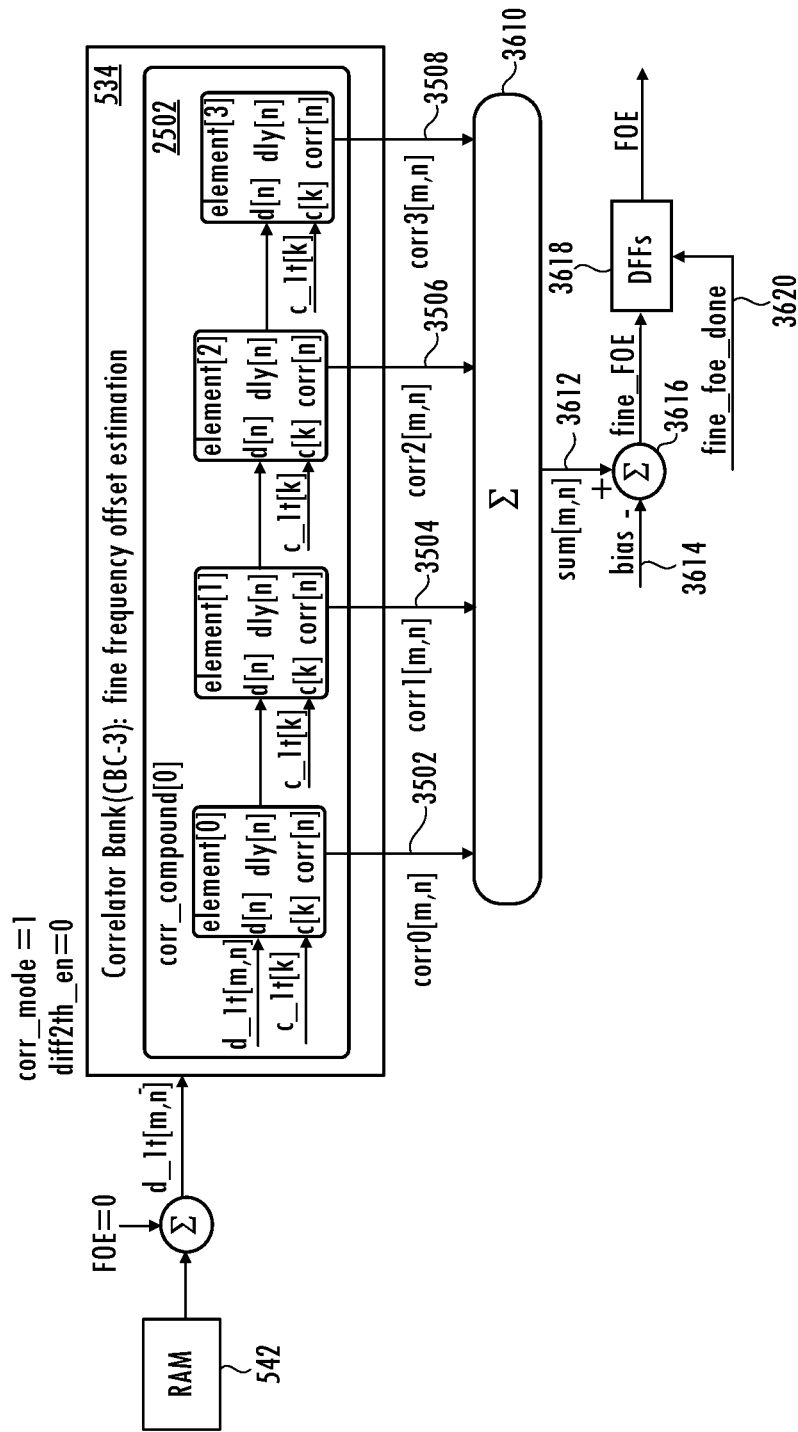
FIG. 36 illustrates the third correlator bank configuration CBC-3.

FIG. 36 illustrates the third correlator bank configuration CBC-3, which is used for fine frequency offset estimation. In this configuration corr_mode=1 and diff2th_en=0. Corr_mode=1 causes the multipliers in the correlator compound to be bypassed to configure the correlator compound as an average filter. In this mode only corr_compound[0] runs and corr_compound[1], corr_compound[2] and corr_compound[3] are turned off. Compound_sel[0:3] controls which of the correlator compounds are enabled during a particular configuration. For CBC-3 the input data (diff_1t [m,n]) comes from memory 542 rather than having the correlator compound processing real-time data. FOE is set to zero for fine frequency offset estimation. Only 4 elements (elements [0:3]) of corr_compound[0] are used in CBC-3. The CBC-3 configuration is used after coarse timing estimation is complete. Based on correlation peak timing, the timing estimation block selects an m value from 0 to 3 through the maximum-correlation criteria. That value of m is used for CBC-3. The four elements (elements [0:3]) supply their respective outputs 3502 (corr0[m,n]), 3504 (corr1 [m,n]), 3506 (corr2 [m,n]), and 3508 (corr3 [m,n]), to the summation block 3610, which supplies sum[m, n] 3612. Since the symbol-to-chip sequence is not DC balanced, the summation output sum[m,n] is compensated with bias value 3614 supplied to summer 3616. D flip-flops 3618 store the output (fine_FOE) of summer 3616. After fine frequency offset estimation is completed, the pulse signal "fine_FOE_done" 3620 samples "fine_FOE" and saves fine_FOE in D flip-flops 3618 to update FOE to the "fine_FOE" value. Note that while summation blocks 3610 and 3616, and the flip-flops 3618 are shown as external to the correlator bank, that functionality may be part of the correlator compounds, the correlator bank, or external to both. That functionality in whole or in part may be performed by the dsss_processor 536 (see FIG. 5).

Figure 37:
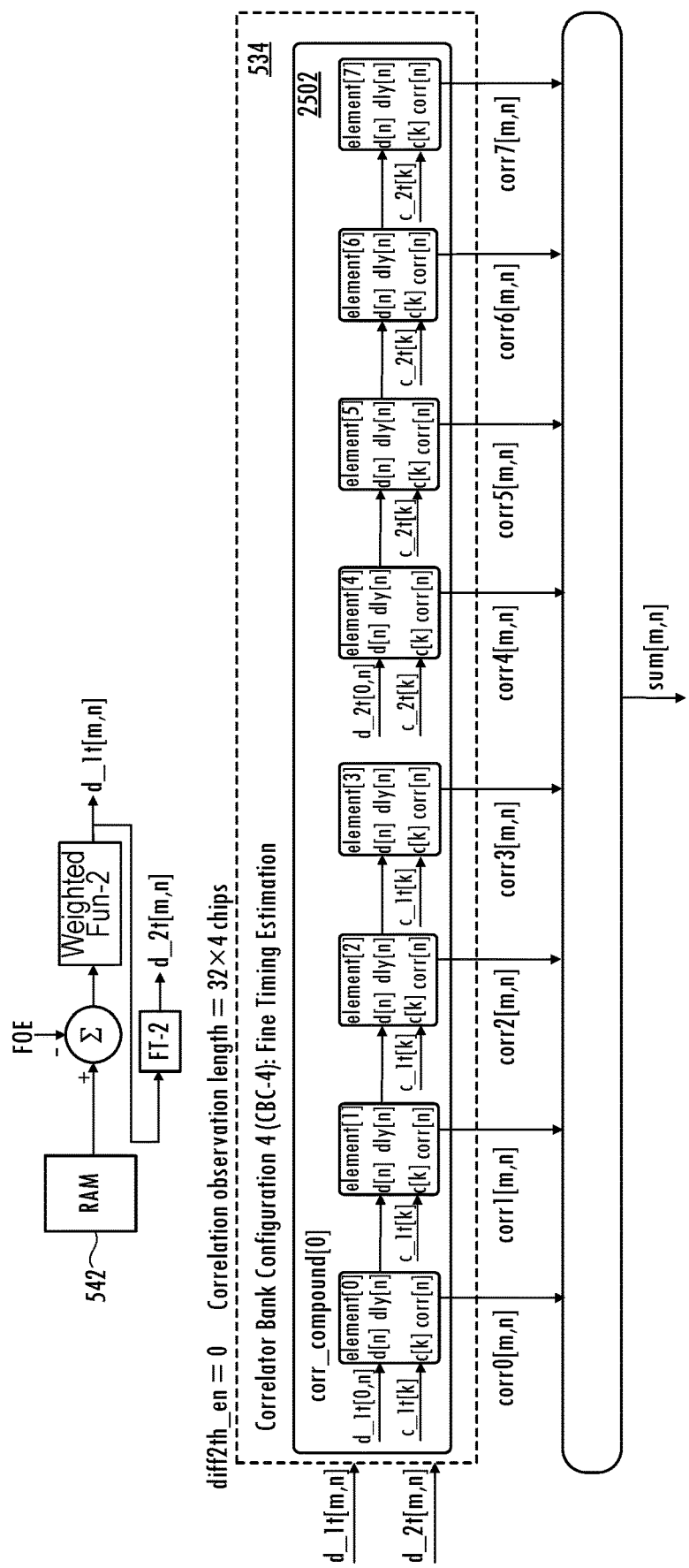
FIG. 37 illustrates the fourth correlator bank configuration CBC-4.

FIG. 37 illustrates the fourth correlator bank configuration CBC-4, which is used for fine timing adjustment. In this configuration corr_mode=0 and diff2th_en=0. In this mode only corr_compound[0] runs and corr_compound[1], corr_compound[2] and corr_compound[3] are turned off based on the setting of compound_sel[0:3], which controls which of the correlator compounds are enabled during a particular configuration. For CBC-4 the input data comes from memory 542 rather than the correlator compound processing real-time data. The output of FT-1 (d_1t[m,n]) is used to generate d_2t[m,n] after summation of (diff_1t[m,n]) with FOE. Eight elements (elements [0:7]) of corr_compound[0] are used in CBC-4. For CBC-4, diff2th_en=0, meaning element[7] of corr_compound[0] is configured as a matched FIR filter. The first four elements (elements [0:3]) in each correlator compound are cascaded as are the last four elements (elements [4:7]). The correlation observation length is four symbols, which equals (32×4) chips. Thus, each correlator element in the first four elements receives the function transformation FT-1 corresponding to a respective one of the four symbols, and each correlator element in the last four elements receives the function transformation FT-2 corresponding to a respective one of the four symbols. Specifically, element[0] of correlator compound[0] receives d_1t[0,n] and the corresponding template signal c_1t[k], element[1] receives the dly[n] output signal from element [0], and the corresponding template signals c_1t[k], etc. Element[4] of correlator compound[0] receives d_2t[0,n] and the corresponding template signal c_2t[k], element[1] receives the dly[n] output signal from element[0], and the corresponding template signal c_2t[k], etc.

Figure 38A:
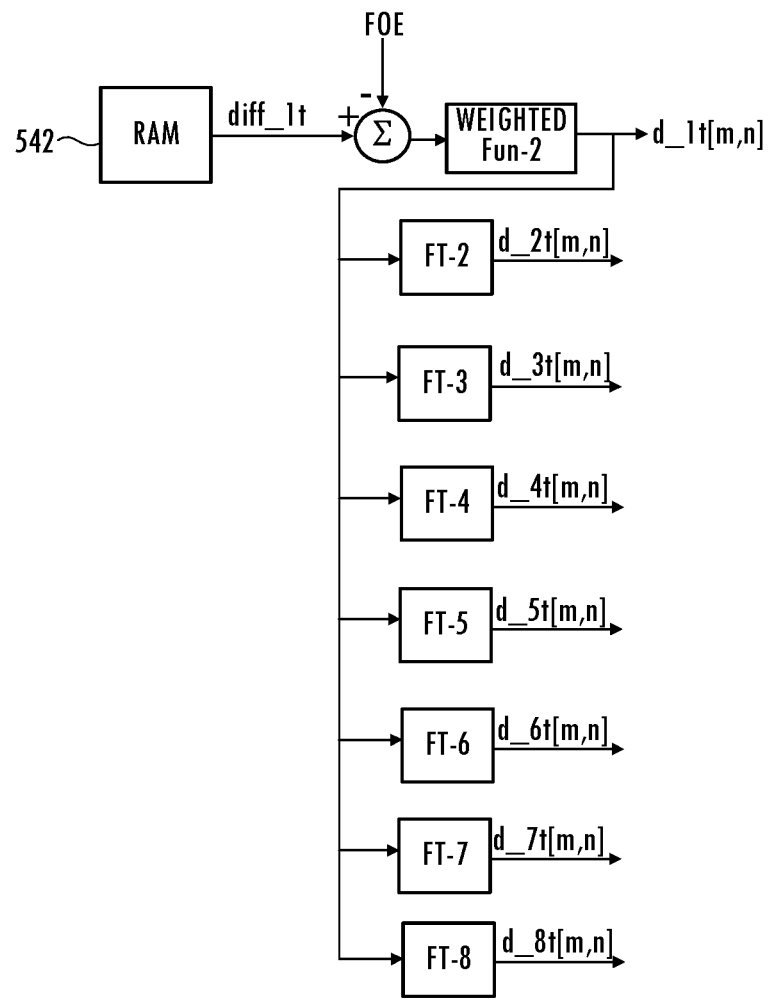
FIG. 38A illustrates the function transformations used for the fifth correlator bank configuration CBC-5.
Figure 38B:
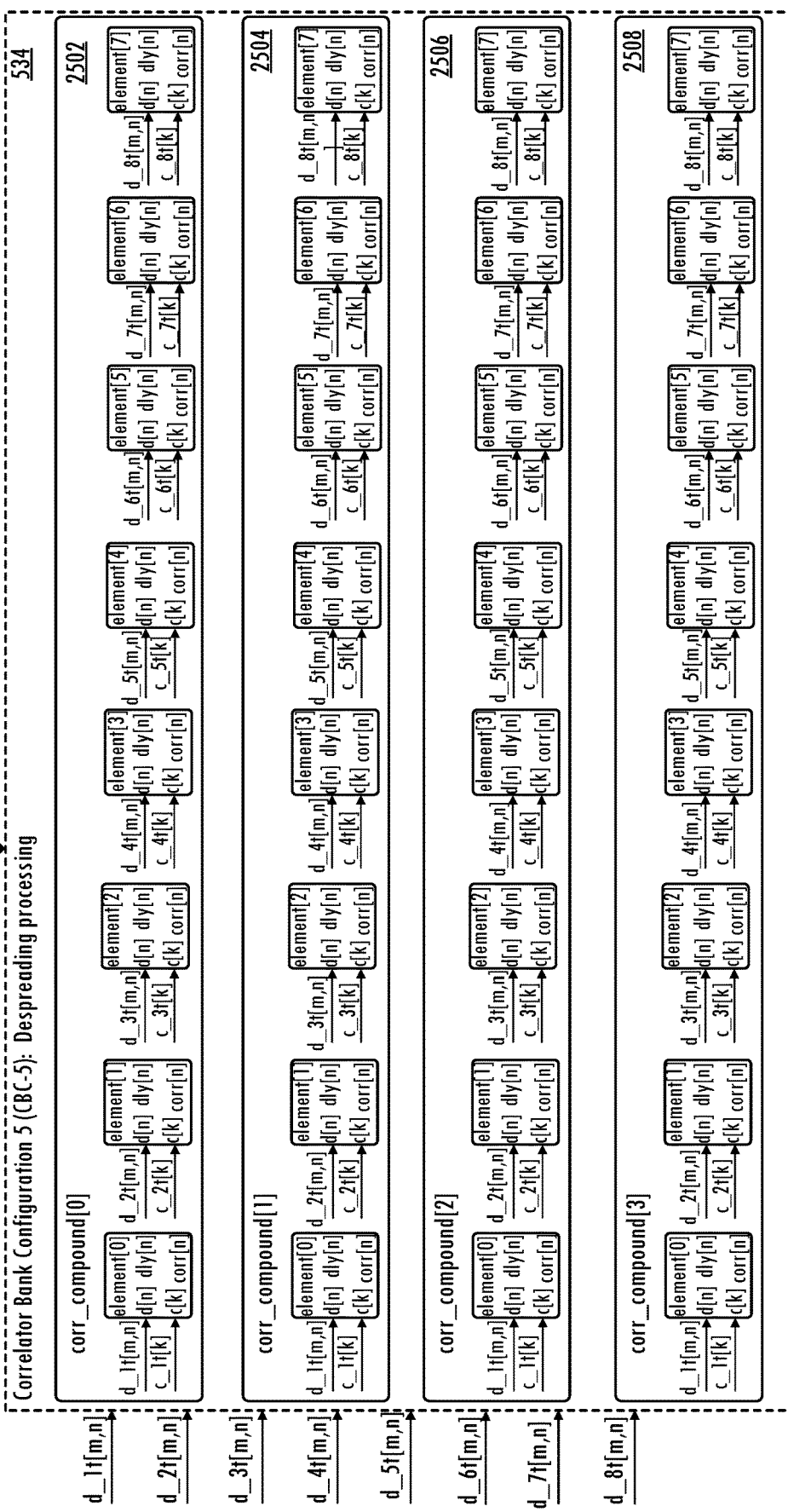
FIG. 38B illustrates the fifth correlator bank configuration CBC-5.

FIGS. 38A and 38B illustrate the fifth correlator bank configuration (CBC-5) used for despreading. All four correlator compounds are enabled for CBC-5 and the input data for the correlator compounds comes from the memory 542. FIG. 38A shows the outputs d_1t[m,n] through d_8t[m,n] of the 8 function transformation blocks FT-1 to FT-8 used in CBC-5. Note the use of Weighted Fun-2 in FIG. 38A. The weighted function is used only after the fine frequency offset estimation is completed. The weighted function would otherwise affect the frequency offset estimation. The data for the function transformation blocks is supplied from memory 542. For CBC-5, diff2th_en=1, meaning element[7] of each correlator compound is configured into the special mode for detecting transitions of frequency deviation. CBC-5 uses elements [0:5] and element[7] but not element[6]. Thus, in an embodiment the FT-7 output is set to zero by the DSSS processor. The correlation observation length is 32 bits, which corresponds to one symbol. The value of phase m (a value of 0 to 3) has been determined from the coarse and fine timing adjustments and that value of m is used for CBC-5. Referring to FIG. 38B, each element receives an output from a different function transformations block to provide robust despreading. Element[0] of correlator compound[0] receives d_1t[m,n] and the corresponding template signals c_1t[k], element[1] receives d_2t[m,n], and the corresponding template signals c_2t[k], etc. Element[0] of correlator compound[1] receives d_1t[m,n] and the corresponding template signals c_1t[k], element[1] receives d_2t[m,n], and the corresponding template signals c_2t[k], etc. Element[0] of correlator compound[2] receives d_1t[m,n] and the corresponding template signals c_1t[k], element[1] receives d_2t [m,n], and the corresponding template signals c_2t[k], etc. Element[0] of correlator compound[3] receives d_1t[m,n] and the corresponding template signals c_1t[k], element[1] receives d_2t[m,n], and the corresponding template signals c_2t[k], etc. The use of the seven function transformations for the despreading processing helps ensure accurate maximum likelihood estimation.

Figure 39:
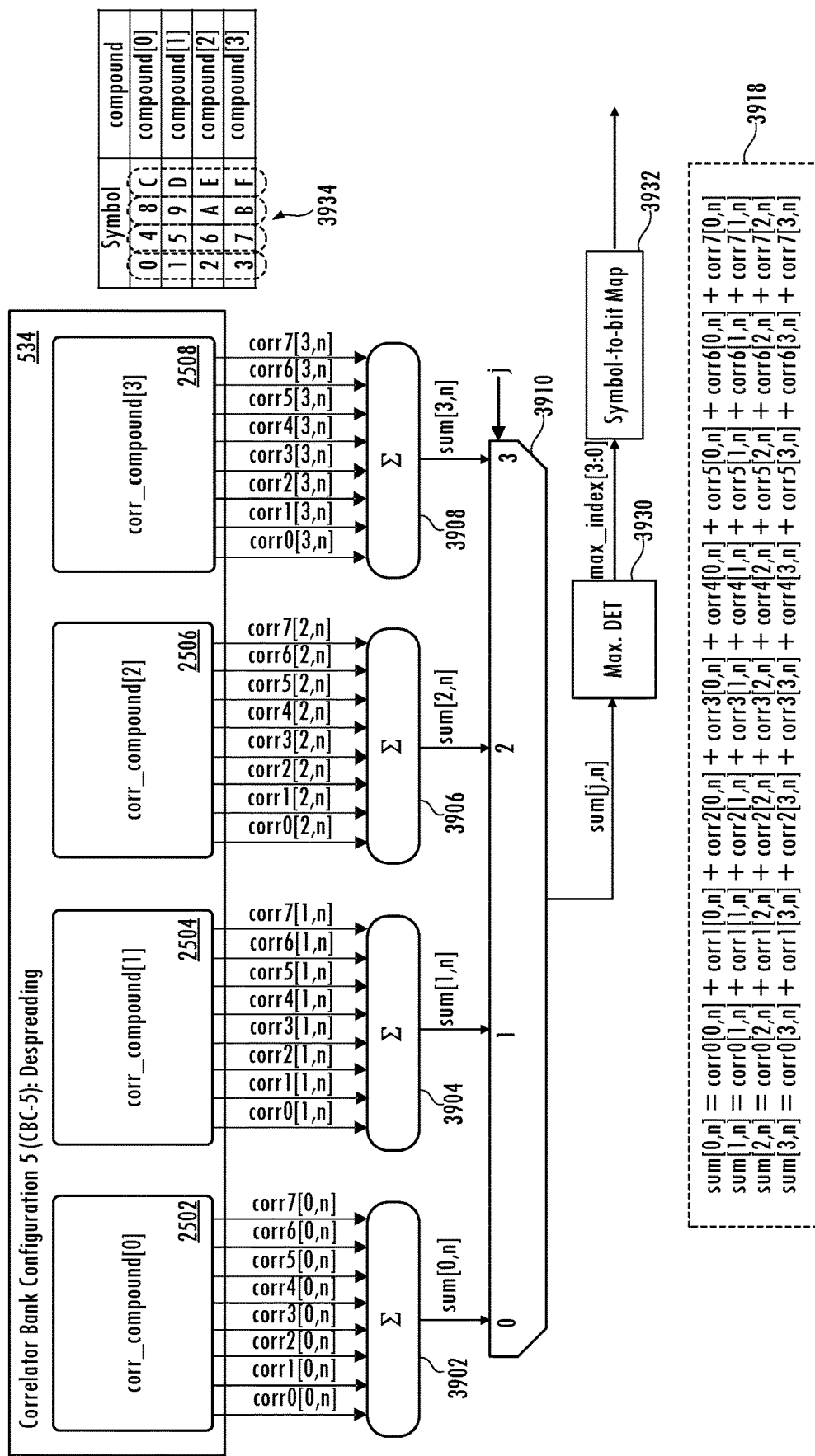
FIG. 39 illustrates another aspect of CBC-5, which is used for despreading.

FIG. 39 illustrates another view of CBC-5 used for the despreading processing. Correlator compound 2502 generates correlator outputs corr0[0,n] to corr7[0,n], which are supplied to summation block 3902. Correlator compound 2504 generates correlator outputs corr0[1,n] to corr7[1,n], which are supplied to summation block 3904. Correlator compound 2506 generates correlator outputs corr0[2,n] to corr7[2,n], which are supplied to summation block 3906. Correlator compound 2508 generates correlator outputs corr0[3,n] to corr7[3,n], which are supplied to summation block 3908. As mentioned previously, corr6 of each compound is not used in CBC-5. In embodiment corr6 is turned off and and its output is set zero. The outputs from the summation blocks (sum[j,n]) are supplied to the selector circuit 3910 that selects one of the correlator outputs according to the value of the control signal "j", where j corresponds to one of the four correlators. The correlator outputs sum [0,n], sum[1,n], sum[2,n], sum[3,n] are selected one at a time by multiplexer 3910, which supplies the maximum detect block 3930 that detects the highest correlation value. The summations are shown in 3918 and remember that corr6=0. Note that while summation blocks 3902-3908 are shown as external to the correlator compounds, that functionality may be part of the correlator compounds, the correlator bank, or external to both. In addition, while multiplexer 3910, the Maximum Det block 3930, and the mapping block 3932 are shown as being external to the correlator bank, some or all of that functionality may be part of the correlator bank. In embodiments, at least some or all of the functionality described in FIG. 39 that is not in the correlator bank is performed by the DSSS processor 536 (see FIG. 5).

The template signals c_1t[k], c_2t[k], c_3t[k],c_4t[k], c_5t[k], c_6t[k], and c_8t[k] corresponding to the sixteen possible symbols shown in the table in FIG. 1 are correlated to the 7 transformations of the 32 received chip values of a received symbol. As indicated at 3934 in a first time period the template signals corresponding to symbols 0, 1, 2, and 3 and the transformations of the received chip values are evaluated in compound[0], compound[1], compound[2], and compound[3], respectively, with the correlation results supplied sequentially to maximum detect logic 3930. In a next time period the template signals corresponding symbols 4, 5, 6, and 7 and the transformations of the received chip values are evaluated in compound[0], compound[1], compound[2], and compound[3], respectively, with the correlation results supplied to maximum detect logic 3930. In a next time period the template signals corresponding to symbols 8, 9, A, and B and the transformations of the received chip values are evaluated in compound[0], compound[1], compound[2], and compound[3], respectively, with the correlation results supplied to maximum detect logic 3930. Finally, the template signals corresponding symbols C, D, E, and F and the transformations of the received chip values are evaluated in compound[0], compound[1], compound[2], and compound [3], respectively, with the correlation results supplied to maximum detect logic 3930. The maximum detect logic determines which of the 16 sums[n, m] is the highest and determines the symbols having the highest correlation value to be the most likely received symbol and supplies the index of the bit values of the symbol in the symbol-to-bit-map 3932.

Figure 40:
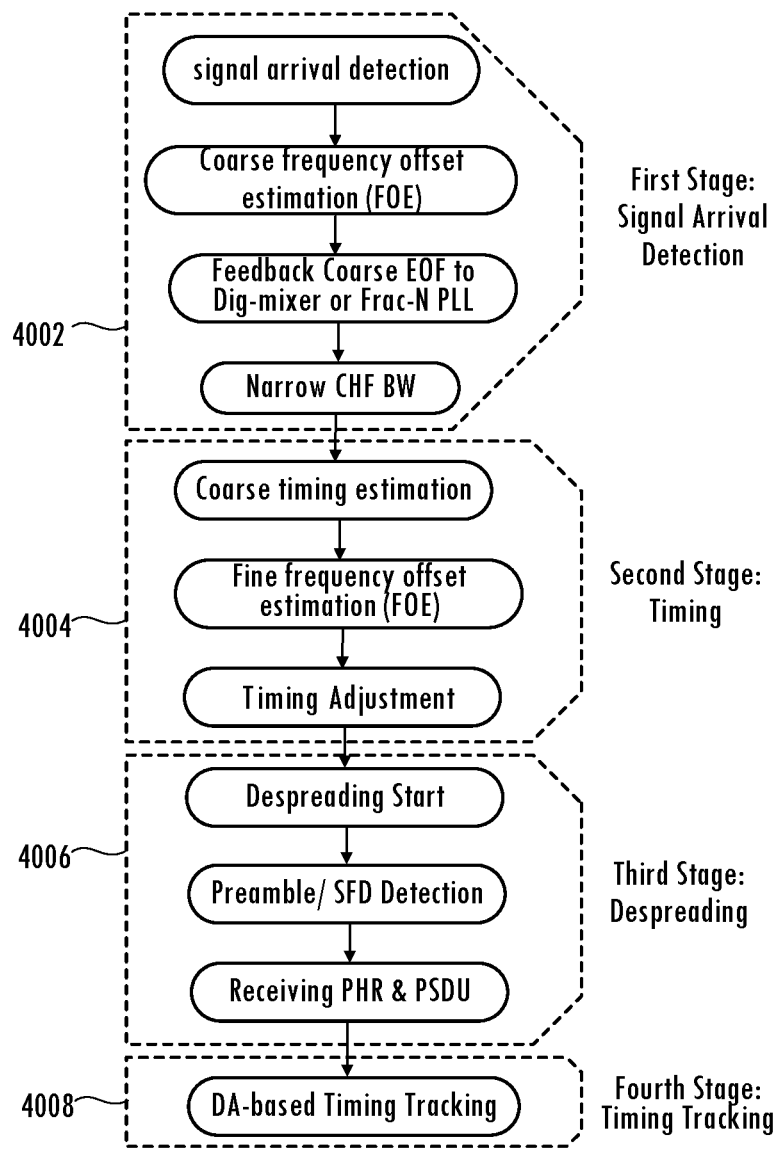
FIG. 40 illustrates a high level flow diagram of the various stages of an embodiment of the demodulation processing.

With the various correlation bank configurations having been described, the following description of demodulation processing explains how the configurable correlator bank is used. FIG. 40 illustrates a high level flow diagram of the various stages of the demodulation processing. The first stage 4002 performs signal arrival detection. The first stage includes signal arrival detection, coarse frequency offset (FOE) estimation, feedback of the coarse FOE to the digital mixer 518 or fractional-N PLL 508 (see FIG. 5), and narrowing the bandwidth of the channel filter 520. The second stage 4004 includes coarse timing estimation, fine FOE estimation, and timing adjustment. The third stage 4006 is despreading and includes the despreading start, preamble/SFD detection, and receiving PHR and the PHY payload (physical service data unit (PSDU)). The fourth stage 4008 tracks timing. In an embodiment the timing tracking stage uses data-aided (DA) based timing tracking schemes that use the transmitted data sequence as side information to facilitate timing estimation. This information is available to the receiver either in the form of a known preamble pattern or preceding the user data. Each of these stages is described further.

Figure 41:
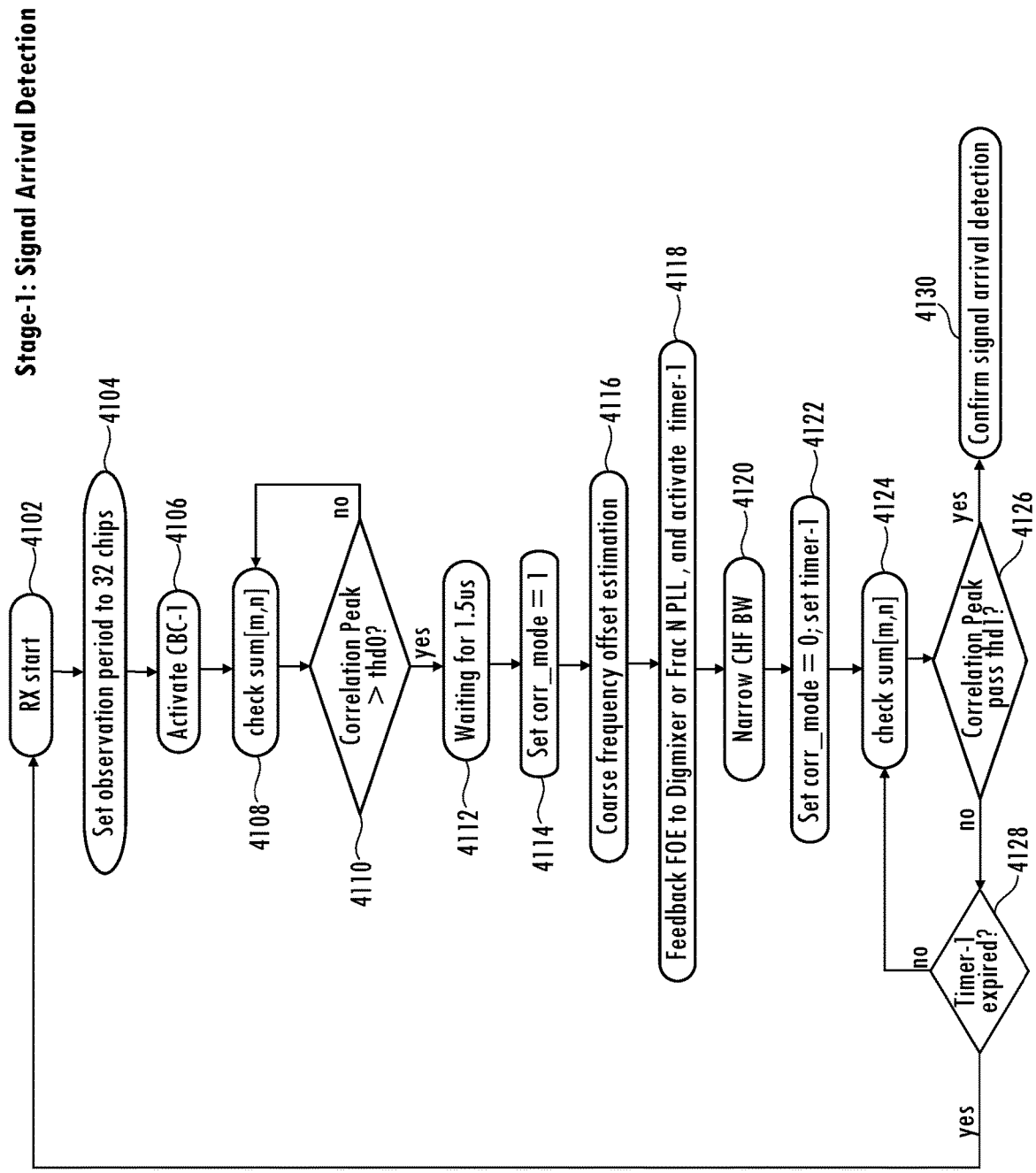
FIG. 41 is an example flow diagram illustrating signal arrival detection.

FIG. 41 is a flow diagram illustrating the signal arrival detection stage in more detail. The flow starts at 4102 at receive (RX) start. The system sets the correlation observation period to one symbol (32 chips) in 4104 and activates CBC-1 at 4106. In a multi-PHY environment, the system requires fast detection to facilitate frequency hopping and avoid missed transmissions. Fast detection needs a short correlation observation period. In the illustrated embodiment, the short correlation observation period for fast detection is 32 chips (for one Zigbee symbol). However, in low signal to noise ratio (SNR) environment, the signal to-be-detected is very weak compared to the noise. In a conventional approach using one correlator, the low SNR makes it very easy to get a false correlation peak and fast detection totally break down. The use of CBC-1 boosts a true correlation peak with a short correlation observation time. Remember that CBC-1 correlates six different differential function transformations in FT-1 to FT-6, an average of adjacent samples FT-7, and frequency deviation transitions in FT-8. Thus, the eight correlation results provide more accuracy for fast detection.

In 4108, the correlation controller checks the correlation results (sum[m,n]) and determines if the correlation results for one of the correlator compounds is greater than the threshold (thd0) in 4110. If the correlation peak is not greater than the threshold in 4110, the system returns to 4108 and continues to check for the first preamble symbol. When one of the correlation peaks >thd0, the system proceeds to 4112 waiting for a fixed length of time, e.g., 3 chips (1.5 μs), to ensure that all preamble samples are inside the registers of the correlator bank. After the delay in 4112, the system sets corr_mode=1 (bypass the multiplier in the element) in 4114 to configure element[0] in corr_compounds[0:3] for determination of FOE. The average frequency of the preamble symbols is a constant with a 32 chip sliding window. FOE can be estimated from element[0]. Once the coarse FOE is made in 4116, that value is fed back in 4118 to the fractional-N PLL 508 or the digital mixer 518 to adjust the frequency so the transmitter and receiver frequencies are better matched. In addition, at 4120 the channel filter bandwidth is reduced to provide better sensitivity and blocking performance. At 4122 another timer (timer-1) is set. In an embodiment timer-1 is set to the time equivalent of 40 chips. The system now looks for a second preamble symbol to confirm signal arrival detection. In 4124, the system checks the correlation results (sum[m,n]) and determines if the correlation results for one of the correlator compounds is greater than the threshold thd1 in 4126. The thd1 in the example flow chart is a higher threshold than thd0 to give more confidence that signal arrival detection is valid. For each check of sum[m,n], if thd1 is not exceeded, the system checks in 4128 to see if timer-1 has expired. If not, the system continues to check the correlation results. If the timer has expired, the system returns to RX start 4102. That allows for a quick exit if the initial signal detection turns out to be erroneous. If one of the correlation peaks is greater than thd1, the system confirms signal arrival detection in 4130 and the demodulator sequence proceeds to the second stage. While some embodiments utilize the first two preamble symbols for signal arrival detections and confirmation, other embodiments may use different preamble symbols or only one preamble symbol and the syncword. For example, in a special application only the last symbol of the preamble is available (e.g., in an antenna diversity mode). In such an application, the syncword (7A) can be used to do additional correlation to determine the timing and enhance the detection reliability.

Figure 42:
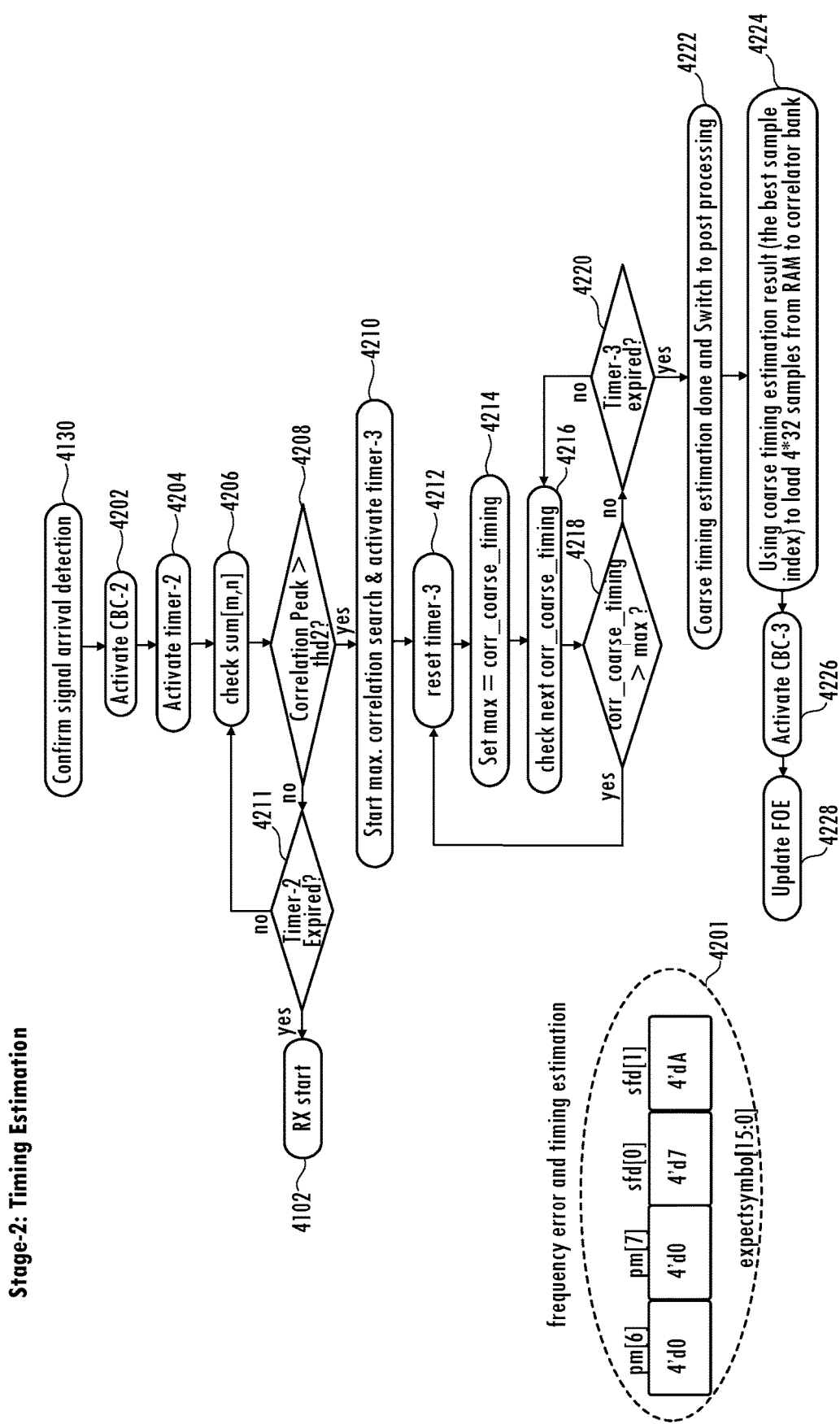
FIG. 42 is an example flow diagram illustrating timing estimation.

FIG. 42 illustrates the second stage, which is timing estimation. After completion of the first stage (confirm signal arrival detection) at 4130, the system activates CBC-2 at 4202 and activates timer-2 at 4204. For the second stage, the observation period is extended to four symbols (128 chips) and only outputs from FT-1 and FT-2 are used as shown in FIG. 34. The four symbols including two preamble symbols and two SFD symbols (pm[6], pm[7], sfd[0], sfd[1]) are shown at 4201. In an embodiment, timer-2 is set for the time equivalent of 400 chips. In 4206, the system checks the correlation results (sum[m,n]) and determines if the correlation results for one of the correlator compounds is greater than the threshold thd2 in 4208. If the process determines that thd2 has not been exceeded in 4208, the system checks in 4211 to see if timer-2 has expired. If not, the system continues to check the correlation results in 4206. If timer-2 has expired, the system returns to RX start 4102 (FIG. 41). That provides another escape point for the demodulation process. If one of the correlation peaks is determined to be greater than thd2 in 4208, the system starts the maximum correlation search and activates timer-3 in 4210. In an embodiment timer-3 is the time equivalent of 8 symbols. Other embodiments assign other time values to timer-3. In 4214, the maximum value (max) is set to current output of CBC-2. As shown in FIG. 35 for CBC-2, sum[m, n]=corr_coarse_timing. In 4216 the demodulator checks the next corr_coarse_timing. In 4218, if the next corr_coarse_timing is greater than the current max, then the flow returns to 4212 to reset timer-3, update max to the current corr_coarse_timing in 4214 and continue to check correlator outputs in 4214. If the current corr_coarse_timing is not greater than the current max in 4218, then the demodulator checks in 4220 if the timer has expired. If not, the flow returns to 4216 to check the next correlator output (corr_coarse_timing). If timer-3 has expired, then the best sample index (0 to 3) is estimated for the 0x00A7 (the last two preamble bits and the SFD).

Figure 43:
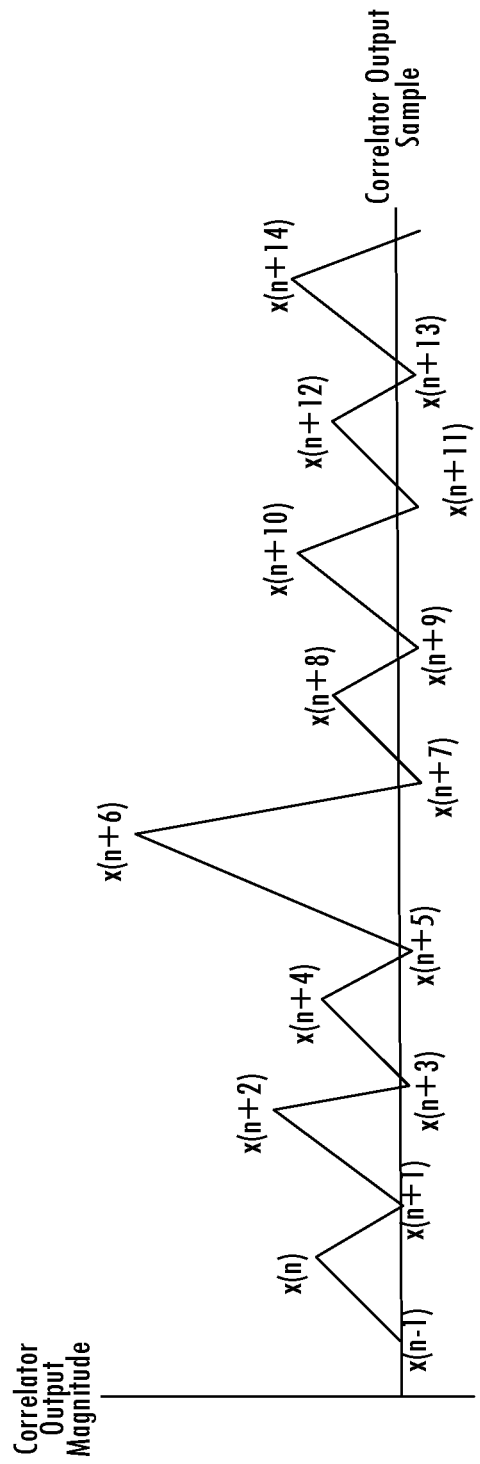
FIG. 43 illustrates the coarse timing search to find the best sample index.

FIG. 43 provides an example of how the coarse timing search works to determine the best sample index. Initially, timer-3 is set to 0. The first correlator output (corr_coarse_timing) is x(n−1). The next correlator output is x(n). Since the correlator output x(n)>x(n−1), max=x(n) and timer-3 is reset to 0. Since x(n+1)<x(n), max=x(n) and timer-3=1. Since x(n+2)>max, max=x(n+2) and timer-3=0. Since x(n+3), x(n+4), and x(n+5)<max, max=x(n+2) and timer-3=3. Since x(n+6)>max, max=x(n+6) and timer-3=0. Since x(n+7), x(n+8), x(n+9),x(10), x(11),x(12), x(13), x(14)<max, max=x(n+6) and timer-3=8. Since timer-3 reaches the threshold 8, the max correlation value is found. The best sample index corresponds to the correlator compound with the maximum correlation value. Remember each correlator compound processes data associated with one of the phases.

Referring back to FIG. 42, the coarse timing estimation is completed in 4222 and the demodulator switches to post processing. In 4224 the coarse timing estimation result (the best sample index m) is used to load 4 symbols (4×32 chips) from RAM and CBC-3 is activated in 4226. CBC-3 is used for fine frequency offset estimation. FOE is updated in 4228 using the results from CBC-3. In embodiments the updated FOE (fine FOE) is used for internal frequency compensation (forward frequency correction) only, e.g., in calculating the function transformations.

Figure 44:
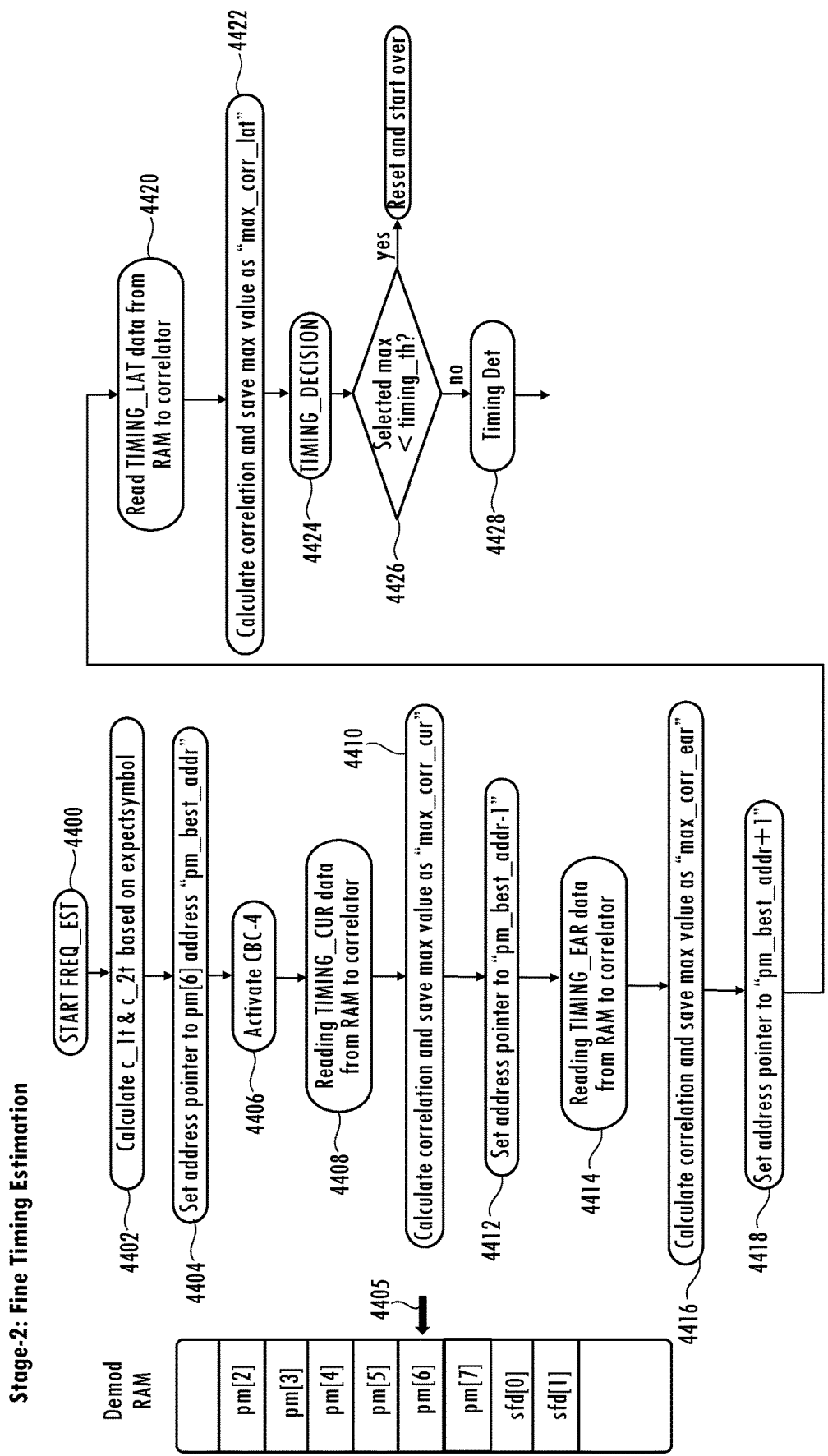
FIG. 44 is an example flow diagram for fine timing adjustment that is performed after the coarse timing estimation.

FIG. 44 illustrates a flow diagram for fine timing adjustment that is performed after the coarse timing estimation. Timing adjustment (fine timing search) uses four symbols (the last 2 preamble symbols+2 SFD symbols) as expected symbols (expectsymbol). Using FT-1 and FT-2, these 4 symbols (4×32=128 chips) are correlated with their template signals c_1t[k] and c_2t[k] with 3 different timing offsets, current timing, early timing, and late timing. The fine frequency estimate starts at 4400. At 4402, the demodulator calculates c1_t and c2_t based on the expected symbol values. At 4404 the demodulator sets the address pointer for the preamble symbol pm[6] to the best pm[6] address (pm_best_addr) 4405 based on the coarse timing estimation (i.e., the best phase sample). At 4406 the demodulator activates CBC-4, which uses only correlator compound 0 and FT-1 and FT-2. At 4408 the current timing data (TIMING_CUR) is read from the RAM and in 4410 the correlation for the four symbols is calculated and the correlation output is saved as max_corr_cur. At 4412 the demodulator sets the address pointer to (pm_best_addr−1), that is to the phase that is one less that the coarse timing best phase. At 4414 the early timing data (TIMING_EAR) is read from the RAM and in 4416 the correlation for the four symbols is calculated and the correlation value is saved as max_corr_ear. At 4418 the demodulator sets the address pointer to (pm_best_addr+1), that is to the phase that is one more that the coarse timing best phase. At 4420 the late timing data (TIMING_LAT) is read from the RAM and in 4420 and in 4422 the correlation for the four symbols is calculated and the correlation value is saved as max_corr_lat. The demodulator makes the timing decision in 4424 by comparing the correlation values for early, late, and current and selects the phase that yields the largest correlator output. In embodiments, the largest correlator output is compared to a timing threshold (timing_th) in 4426 and if the selected max value is less than the timing_th the correlator resets and starts over. If the largest correlator output is greater than the timing threshold, then the fine timing determination is considered completed in 4428.

Figure 45:
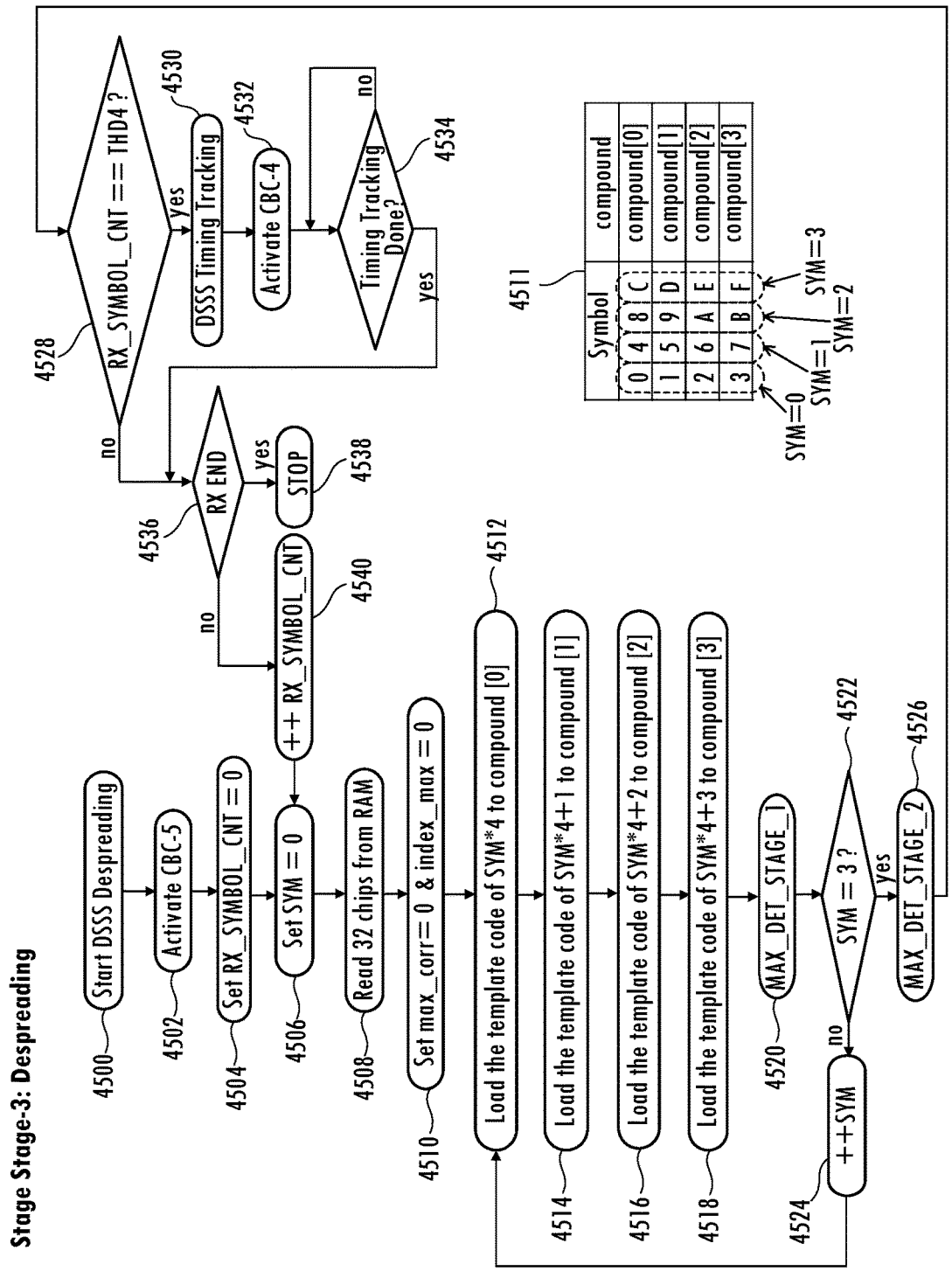
FIG. 45 illustrates an example flow diagram of despreading.

FIG. 45 shows an example flow diagram of despreading, which is the third demodulation stage. Based on the fine timing result, one sample per chip from RAM is used for despreading processing. DSSS despreading starts at 4500. Referring to both FIG. 45 and FIG. 39, the demodulator activates CBC-5 in 4502. CBC-5 uses all four correlator compounds (but not element[6]). At 4504, the receive symbol count is set to 0. At 4506, SYM is set to 0. At 4508 32 chips are read from RAM and transformations of the chips are stored into the correlator registers of each of the correlator compounds. At 4510 max_corr is set to 0 and the index (index_max) is set to 0. At 4512, 4514, 4516, and 4518, the template codes corresponding to four symbols are loaded into the four correlator compounds. As shown at 4511, when SYM=0, the four symbols 0, 1, 2, and 3 are respectively loaded into the four correlator compounds. On the next pass through the loop with SYM=1, the symbols 4, 5, 6, and 7 are respectively loaded into the four correlator compounds. On the next pass through the loop with SYM=2, the symbols 8, 9, A, and B are respectively loaded into the four correlator compounds. On the next pass through the loop with SYM=3, the symbols C, D, E, and F are respectively loaded into the four correlator compounds. That allows four symbols at a time to be correlated against the received 32 chips. MAX_DET_STAGE_1 at 4520 compares the four correlator compound outputs to determine the maximum correlation value and saves the maximum correlation value of the four correlator compounds to memory as max_corr and also saves the index of the correlator compound (0, 1, 2, or 3) to memory as the index_max. A separate max_corr value and corresponding index_max is saved for each pass through the loop. In 4522 the process checks to see of all 16 symbols have been correlated (SYM=3?) and if not, the value of SYM is incremented in 4524 and the flow returns to load up the next four templates. That loop continues until the 16 template codes corresponding to the sixteen symbols have been correlated and four max_corr values and corresponding four index_max have been determined. At 4526 in MAX_DET_STAGE_2, the demodulator compares the four max_corr values to determine which correlator compound had the largest correlation value and for which loop in order to determine the mostly likely symbol for the received signal. Of course there are many possible sequence flows readily apparent to those of skill in the art to determine which of the sixteen correlation values has the maximum value and therefore is the most likely symbol. The flow then proceeds to 4528 where the symbol count is compared to THD4. THD4 defines how many symbols are used for timing tracking. If the symbol count does not equal THD4, the tracking loop does not start and the receiver keeps receiving if RX END is no. If the symbol count=THD4, then the demodulator starts tracking timing at 4530, activates CBC-4 in 4532 and when tracking is done in 4534 checks if the receive activity is completed meaning that all payloads have been received in 4536. If yes, the flow stops at 4538. If the receive is still active, the symbol count is incremented in 4540 and the next 32 chips are evaluated to determine the most likely symbol received.

Figure 46:
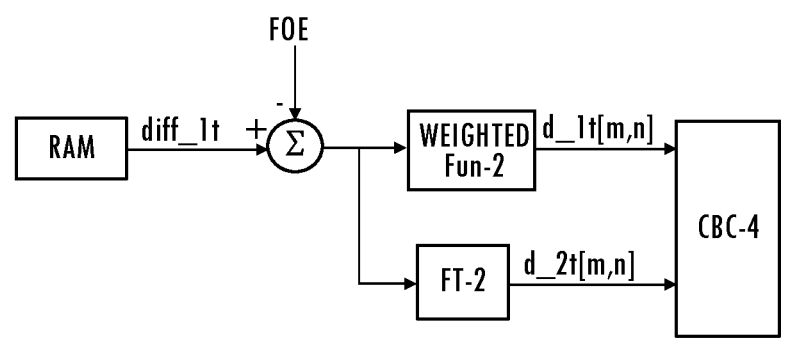
FIG. 46 illustrates the configuration used for time tracking.

FIG. 46 illustrates the configuration used for time tracking. CBC-4 is used and Weighted Function-2 is applied to (diff_1t−FOE), to generate d_1t[m,n]. The transformation output d_2[m,n] is derived from d_1t[m,n]. Referring back to FIG. 37, CBC-4 utilizes cascaded elements element[0] to element[3] and element[4] to element[7]. Only compound [0] is used. The time tracking ensures that the demodulation process accounts for any timing drift that may occur.

Thus, a configurable correlator bank for a non-coherent DSSS demodulator has been described. The description of the invention set forth herein is illustrative, and is not intended to limit the scope of the invention as set forth in the following claims. Other variations and modifications of the embodiments disclosed herein, may be made based on the description set forth herein, without departing from the scope of the invention as set forth in the following claims.

What is claimed is:

1. A demodulator comprising:
a correlator bank including a plurality of correlators, the correlator bank configurable into a plurality of configurations including a signal arrival configuration, a coarse timing configuration, and a despreading configuration, to correlate function transformations of one or more received signals; and
wherein the correlator bank is coupled to receive the function transformations of one or more received signals and template signals corresponding to expected signals.

2. The demodulator as recited in claim 1, further comprising:
a function transformations block coupled to receive phase information from a Cordic and to generate the function transformations and supply the function transformations to the correlator bank, the function transformations block to generate a first transformation that includes a one chip differential, additional transformations that include respective multi-chip differentials, an average transformation that includes an average of a one-chip phase difference between two adjacent samples, and a second order phase differentiation used for frequency deviation correlation.

3. The demodulator as recited in claim 2, wherein the function transformations block is configured to apply a first weighted function or a second weighted function to generate function transformations that utilize multi-chip chip differentials.

4. The demodulator as recited in claim 1, wherein each of the correlators includes a plurality of correlator elements and wherein each of the correlators is supplied in at least one configuration with function transformations corresponding to a particular sampling phase of a plurality of samples for each chip of one or more symbols being correlated.

5. The demodulator as recited in claim 4, wherein in a coarse frequency offset estimation, one of the correlator elements is configured as an average filter.

6. The demodulator as recited in claim 1, wherein the correlator bank is configurable into a fine frequency offset configuration in which only a portion of one of the correlators is used.

7. The demodulator as recited in claim 1, further wherein the correlator bank is configurable into a fine timing configuration in which only one of the correlators is used.

8. The demodulator as recited in claim 1, wherein in the despreading configuration each of the correlators compares transformations corresponding to a received symbol to respective template signals corresponding to function transformations of respective possible symbols to determine a most likely symbol value for a received symbol.

9. The demodulator as recited in claim 4, wherein one of the correlator elements in each of the correlators is configurable in a first mode as a finite impulse response (FIR) filter and in a second mode for use to correlate transitions of frequency deviation.

10. The demodulator as recited in claim 9, wherein in the second mode the one of correlator elements receives a second order phase differentiation function transformation of a received symbol, a template signal, and an xor template signal that is a shifted version of the template signal XORed with the template signal.

11. The demodulator as recited in claim 10, the one of the correlator elements in the second mode generates an element output that depends on a value of the template signal and an output from a delay element in the one of the correlator elements responsive to the xor template signal being a first value and depends on a range determination responsive to the xor template signal being a second value.

12. The demodulator as recited in claim 1,
wherein in the signal arrival configuration the correlator bank is configured to process a first plurality of function transformations of a first symbol; and
wherein in the coarse timing configuration the correlator bank is configured as matched FIR filters to process two function transformations of each a plurality of symbols.

13. The demodulator as recited in claim 1, wherein each of the correlators includes a plurality of correlator elements, and each of the correlator elements includes a plurality of delay blocks corresponding to a number of chips in a symbol, a multiply function coupled to multiply an output of each of the delay blocks by one bit of a template signal, and a summation block to sum the output of multiply function and supply an element output, the multiply function being an inversion or no inversion of the output of each of the delay blocks based on a value of the one bit of the template signal.

14. A method for demodulating one or more received signals comprising:
configuring a correlator bank into a plurality of configurations to correlate function transformations of one or more received symbols, the plurality of configurations including a signal arrival configuration, a coarse timing configuration, and a despreading configuration;
receiving phase information in a function transformations block;
generating the function transformations in the function transformations block, the function transformations including a one chip differential, additional transformations that include respective multi-chip differentials, an average transformation that includes an average of a one-chip phase difference between two adjacent samples of a signal, and a second order phase differentiation used for frequency deviation correlation; and
supplying the function transformations to the correlator bank.

15. The method as recited in claim 14, further comprising applying a first weighted function or a second weighted function to generate the function transformations that utilize multi-chip chip differentials.

16. The method as recited in claim 14, further comprising:
processing a first plurality of function transformations of a first received symbol in the signal arrival configuration in the correlator bank;
processing two function transformations of each of a plurality of symbols in the correlator bank in the coarse timing configuration; and
processing transformations corresponding to a received symbol to respective template signals corresponding to possible symbols in each correlator compound of the correlator bank to determine a most likely symbol value for the received symbol.

17. The method as recited in claim 14, further comprising:
configuring the correlator bank into a fine frequency offset configuration in which only a portion of one correlator of a plurality of correlators in the correlator bank is used and determining a fine frequency offset; and
configuring the correlator bank into a fine timing configuration in which only one of the plurality of correlators is used and determining a fine timing estimate.

18. The method as recited in claim 14, further comprising:
configuring a correlator element in each of a plurality of correlators in the correlator bank in a first mode to be a finite impulse response (FIR) filter and in a second mode for use in correlating transitions of frequency deviation;
the one of correlator elements in the second mode receiving a template signal and an xor template signal that is a shifted version of the template signal XORed with the template signal; and
the one of the correlator elements in the second mode generating an element output that depends, responsive to a first value of the xor template signal, on a value of the template signal and an output from a delay element in the correlator element and depends, responsive to a second value of the xor template signal, on a range determination.

19. A demodulator comprising:
a correlator bank including a plurality of correlators, the correlator bank configurable into a plurality of configurations including a signal arrival configuration, a coarse timing configuration, and a despreading configuration, to correlate function transformations of one or more respective received symbols to template signals;
wherein each of the correlators includes a plurality of elements, and each of the plurality of elements includes a plurality of delay blocks corresponding to a number of chips in a symbol, a multiply function coupled to multiply an output of each of the delay blocks by one bit of a template signal, and a summation block to sum an output of the multiply function and supply an element output; and
a function transformations block coupled to receive phase information from a Cordic and to generate the function transformations and supply the function transformations to the correlator bank, the function transformations block to generate a first transformation that includes a one chip differential, additional transformations that include respective multi-chip differentials, an average transformation that includes an average of a one-chip phase difference between two adjacent samples, and a second order phase differentiation used for frequency deviation correlation.

20. The demodulator as recited in claim 19,
wherein in the signal arrival configuration each element in each of the correlators receives a different one of the function transformations of a first symbol and a corresponding template signal, each correlator receiving function transformations corresponding to a different sampling phase;
wherein in the signal arrival configuration the demodulator is configured to sum up eight element outputs from each correlator to generate a first correlator sum and compares that first correlator sum to a first threshold;
wherein in the coarse timing configuration each correlator of the correlator bank is configured to process two function transformations of four symbols; and
wherein in the coarse timing configuration the demodulator is configured to sum eight element outputs from each correlator to generate a second correlator sum and compares the second correlator sum to a second threshold.

* * * * *